(12) United States Patent
He et al.

(10) Patent No.: US 12,098,974 B2
(45) Date of Patent: Sep. 24, 2024

(54) RADIO FREQUENCY WIRELESS SENSING DEVICE

(71) Applicant: HIS MAJESTY THE KING IN RIGHT OF CANADA AS REPRESENTED BY THE MINISTER OF NATURAL RESOURCES CANADA, Ottawa (CA)

(72) Inventors: Youliang He, Ancaster (CA); Maciej Podlesny, Woodstock (CA)

(73) Assignee: HIS MAJESTY THE KING IN RIGHT OF CANADA AS REPRESENTED BY THE MINISTER OF NATURAL RESOURCES CANADA, Ottawa (CA)

(*) Notice: Subject to any disclaimer, the term of this patent is extended or adjusted under 35 U.S.C. 154(b) by 503 days.

(21) Appl. No.: 17/430,053

(22) PCT Filed: Feb. 12, 2020

(86) PCT No.: PCT/CA2020/050182
§ 371 (c)(1),
(2) Date: Aug. 11, 2021

(87) PCT Pub. No.: WO2020/163951
PCT Pub. Date: Aug. 20, 2020

(65) Prior Publication Data
US 2022/0136922 A1 May 5, 2022

Related U.S. Application Data

(60) Provisional application No. 62/804,859, filed on Feb. 13, 2019.

(51) Int. Cl.
G01M 3/18 (2006.01)
G01N 17/04 (2006.01)
(Continued)

(52) U.S. Cl.
CPC .............. *G01M 3/18* (2013.01); *G01N 17/04* (2013.01); *G06K 7/10366* (2013.01); *G06K 19/0723* (2013.01); *G06K 19/07773* (2013.01)

(58) Field of Classification Search
CPC .......... G01M 3/18; G01M 3/16; G01N 17/04; G06K 7/10366; G06K 19/0723;
(Continued)

(56) References Cited

U.S. PATENT DOCUMENTS 7,675,295 B2 * 3/2010 Materer ................ G01N 17/04
324/649
9,515,365 B2 12/2016 McCormack et al.
(Continued)

FOREIGN PATENT DOCUMENTS

JP 2008-90813 A 4/2008
JP 2010-164416 A 7/2010

OTHER PUBLICATIONS

Extended European Search Report issued by European Patent Office in corresponding European Application No. EP 20755128, Oct. 14, 2022.
(Continued)

*Primary Examiner* — Amine Benlagsir
(74) *Attorney, Agent, or Firm* — Hoffmann & Baron, LLP

(57) ABSTRACT

The present application provides an apparatus comprising a radio frequency identification (RFID) sensor comprising: an antenna configured to receive an interrogation signal from a reader and to transmit a response signal to the reader; at least one integrated circuit (IC) connected to the antenna; and at least one sensing element. The apparatus further comprises a channel for directing transmission of signals between the
(Continued)

antenna and the reader, wherein the RFID sensor is attached or directly adjacent to a first end of the channel. The sensing element is responsive to a change induced by its environment to switch from a conductive state to a non-conductive state, or from a non-conductive state to a conductive state. The present application further provides a method for monitoring the integrity or the change in environment of a buried structure using the RFID sensor-containing apparatus.

20 Claims, 25 Drawing Sheets

(51) Int. Cl.
*G06K 7/10* (2006.01)
*G06K 19/07* (2006.01)
*G06K 19/077* (2006.01)

(58) Field of Classification Search
CPC .... G06K 19/07773; G01D 21/00; H04B 5/77; H04B 13/02

See application file for complete search history.

(56) References Cited

U.S. PATENT DOCUMENTS

| | | | |
|---|---|---|---|
| 2005/0172721 A1* | 8/2005 | Daigle | E21B 47/06 73/705 |
| 2006/0125493 A1 | 6/2006 | Subramanian et al. | |
| 2008/0204275 A1 | 8/2008 | Wavering et al. | |
| 2012/0007579 A1* | 1/2012 | Apblett | G01N 17/04 324/71.1 |
| 2012/0248569 A1* | 10/2012 | Jenkins | H01L 23/49822 257/E27.026 |
| 2013/0036821 A1 | 2/2013 | Belkerdid et al. | |
| 2013/0278360 A1* | 10/2013 | Kim | H01P 3/165 333/239 |
| 2014/0306725 A1 | 10/2014 | Carr | |
| 2015/0248569 A1* | 9/2015 | Rushing | G01C 15/04 340/10.34 |
| 2017/0356870 A1* | 12/2017 | Doany | G01N 17/02 |
| 2018/0236604 A1* | 8/2018 | Bi | B23K 26/21 |

OTHER PUBLICATIONS

Notification of Reason(s) for Refusal issued in Japanese Application No. JP 2021-547201 on Nov. 27, 2023, and English translation thereof.

* cited by examiner

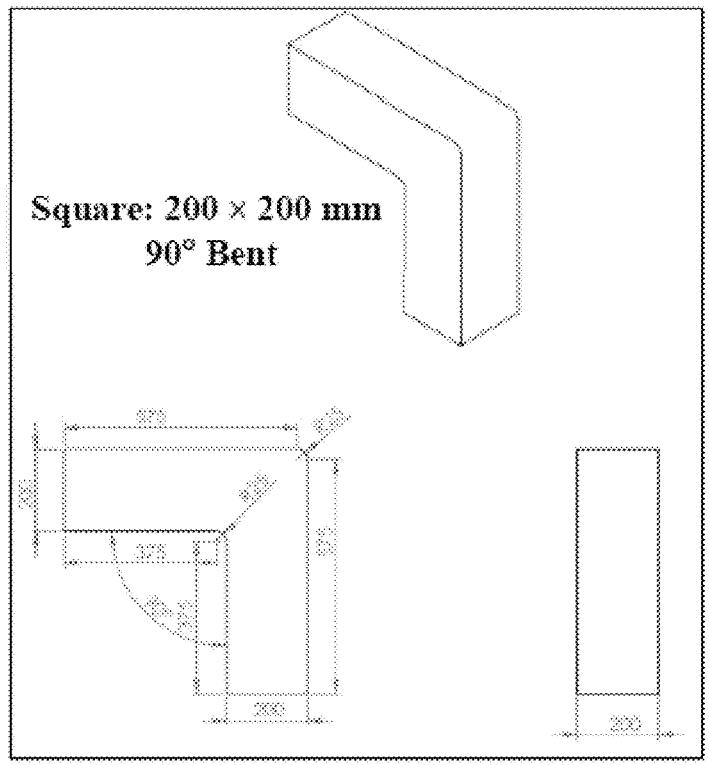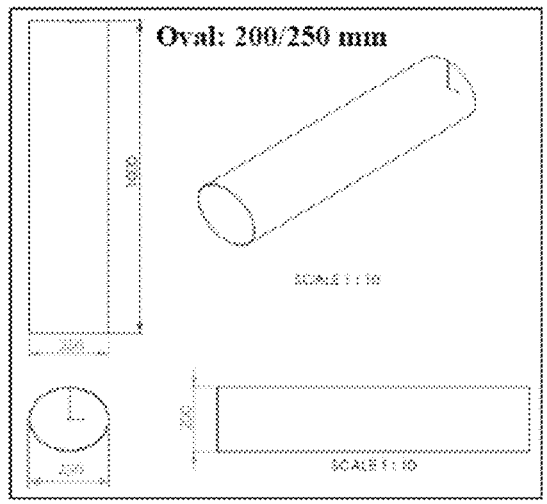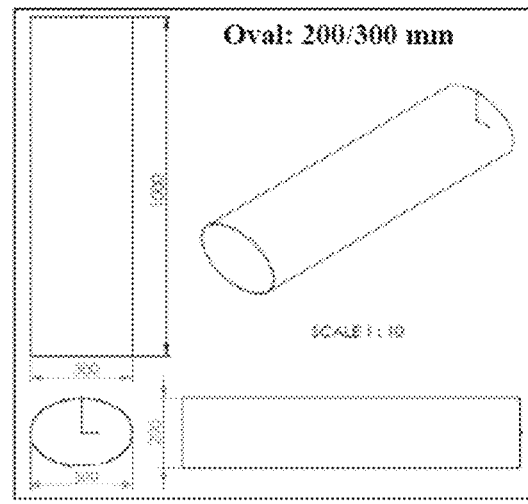
Figure 15, continued

Figure 15, continued

RADIO FREQUENCY WIRELESS SENSING DEVICE

CROSS-REFERENCE TO RELATED APPLICATIONS

The present application is the U.S. National Phase of, and Applicant claims priority from, International Patent Application Number PCT/CA2020/050182 filed Feb. 12, 2020, which claims priority from U.S. Provisional Application No. 62/804,859, filed Feb. 13, 2019, each of which is incorporated by reference herein in its entirety for all purposes.

FIELD OF THE INVENTION

The present application pertains to the field of wireless sensors. More particularly, the present application relates to radio frequency wireless sensing devices, and methods of use thereof to monitor underground or underwater structures.

INTRODUCTION

Corrosion is a common material degradation process occurring in almost every engineering system. It negatively impacts the performance and reliability of various infrastructures, and occasionally results in catastrophic consequences if not properly monitored and timely managed. Thus, monitoring the occurrence and accumulation of corrosion is of great importance for the safe operation of the engineering systems.

Corrosion monitoring sensors have been developed to detect the progress of corrosion, or to provide warning if a certain level of corrosion has been reached. For example, corrosion probing technologies and devices have been developed and implemented in various infrastructures, e.g., bridges, buildings, airplanes, vehicles, and refinery plants, to proactively alarm/inform operators to take corrective actions before incidents occur.

However, implementing corrosion sensors for buried infrastructures (where "buried" is intended here to refer to both underground and underwater infrastructures), e.g., pipelines, has long been a challenge since these infrastructures are usually located in remote regions with harsh environments, and access to the structures is usually very limited. In addition, the buried infrastructures may span thousands of kilometers, such that it is difficult and expensive, or unfeasible, to monitor even a small portion of the buried structure using the currently available sensors. In addition, once a buried structure leaks, timely detection of the leak and reliable warning to the operators, are a big challenge for the industries, e.g., the oil and gas industry.

Corrosion monitoring is the probing and evaluation of changes of a material caused by corrosion damage, which may include a change of mass (loss or gain), a variation of physical, chemical, electrical, magnetic or mechanical properties, and/or a change of the dimensions or appearance (e.g., thinning, color change, cracking, peeling, etc.). Different corrosion monitoring technologies have been developed to detect and evaluate these changes. For example, visual inspection by human being is the oldest and most common method to observe the corrosion status of infrastructures. The examination of corrosion coupons (mass loss or gain) in the laboratory is the classic method for quantitative corrosion evaluation. Additionally, numerous corrosion monitoring sensors have been developed based on different principles, and some of them have already been implemented in related industries.

Unfortunately, most of the currently available corrosion monitoring technologies are either very difficult or too expensive to be implemented for buried structures. For example, the basic corrosion coupon method is essentially not viable to be used in pipelines since the placement and retrieval of the testing coupons to/from the buried pipeline is time consuming and costly. Other corrosion monitoring techniques, e.g., electrical resistance probe, electrochemical impedance spectroscopy, linear polarization resistance, fiber optic, etc., all require physical connection to the sensor, i.e., they need the use of wires or fibers to connect the sensors to the readers/data loggers to accomplish the measurements or to transfer data. This has serious drawbacks since it limits the placement of sensors to only the locations where wire/fiber can be routed and direct connection to the sensor is possible. In addition, the process of implementing these systems with underground pipelines and the measurement itself are very difficult and time consuming.

Although wireless corrosion sensors (mostly based on radio frequency identification, RFID) have been developed to overcome these drawbacks, the application of such wireless sensors to buried structures (such as underground or underwater pipelines) is essentially impossible because those sensors are usually near-field and require the reader to be very close to the sensor (typically in the range of a few centimeters) to get effective reading. Such systems cannot be implemented with underground pipelines, which are usually buried 1 to 2 meters below the surface. Furthermore, it is well known that radio frequency is extremely difficult to be transmitted through water. Consequently, it is not possible to directly implement RFID based sensors in underwater pipelines.

There remains a need for a corrosion monitoring sensor that is wireless (no need for direct connection to the sensor), cost effective, small size and weight, simple operation and data analysis, and low or without maintenance, for underground or underwater applications. There is also a need for a similar sensor that can conveniently detect leakage if the pipeline does leak.

The above information is provided for the purpose of making known information believed by the applicant to be of possible relevance to the present invention. No admission is necessarily intended, nor should be construed, that any of the preceding information constitutes prior art against the present invention.

SUMMARY

An object of the present application is to provide a radio frequency wireless sensing device. In accordance with an aspect of the present application, there is provided an apparatus comprising: (i) a radio frequency identification (RFID) sensor comprising: an antenna configured to receive an interrogation signal from a reader and to transmit a response signal to the reader; at least one integrated circuit (IC) connected to the antenna; and at least one sensing element; and (ii) a channel for directing transmission of signals between the RFID sensor and the reader, wherein the RFID sensor is attached or directly adjacent to a first end of the channel, wherein the sensing element is responsive to a change induced by its environment to switch from a conductive state to a non-conductive state, or to switch from a non-conductive state to a conductive state. The at least one IC are optionally contained within a protective housing such that only the at least one sensing element is exposed to the environment. The RFID frequency can be in the ultrahigh range or the microwave range.

In accordance with one embodiment, there is provided an apparatus in which the channel is made of non-conductive material, and is filled with a non-conductive particulate material, such as sand (silicon dioxide), aluminum oxide, silicon carbide or the like, to assist the transmission of the signal through the channel. In accordance with another embodiment, the channel is made of conductive material or comprises a conductive inner surface, in which case, no particulate material is required to fill the channel. The channel can be, for example, straight, curved or bent. Also, the channel can have a cross-section shape that is a square, rectangle, circle, or oval. In certain embodiments, the channel is sealed at both ends with a non-conductive, corrosion resistant material, for example, to prevent the penetration of water into the channel.

In accordance with another embodiment, the at least one sensing element is: integrated in the RFID sensor as a short circuit between the IC and the antenna; or integrated as a connection between the antenna and the IC; or plugged into the sensor and acting as a short circuit between the antenna and the IC, or as a connection between the antenna and the IC.

In accordance with one embodiment, the reader is sufficiently distant from the RFID sensor that it is necessary for the RFID sensor to have a battery.

In accordance with one embodiment, the at least one sensing element is initially conductive and provides a short circuit to the RFID sensor. When the sensing element switches to a non-conductive state, the short circuit is broken. In accordance with another embodiment, the at least one sensing element is initially non-conductive and there is no short circuit to the RFID sensor. When the sensing element switches to a conductive state, the short circuit to the RFID sensor is established. The sensing element optionally comprises a corrodible material or a material that is sensitive to changes in the environment caused by the presence of leaked substance. In one embodiment, the sensing element is sensitive to the presence of a leaked substance, for example, by reacting with the leaked substance or degrading in the presence of the leaked substance.

Another aspect of the present application provides a method of using, or a use of, the above described apparatus for detecting a change in a buried structure, such as may be caused by the environment of the buried structure. The change can be, for example, corrosion, breakage or leakage.

Another aspect of the present application provides a method for detecting a change induced by an environment of a buried structure, said method comprising the steps of: (i) positioning a radio frequency identification (RFID) sensor adjacent to the buried structure or attaching the RFID sensor to the buried structure, wherein the RFID sensor comprises: an antenna configured to receive an interrogation signal from a reader and to transmit a response signal to the reader; at least one integrated circuit (IC) connected to the antenna; and at least one sensing element in an initial condition, wherein the RFID sensor is attached to or directly adjacent to one end of a channel for directing transmission of signals between the RFID sensor and the reader, and wherein the sensing element is responsive to a change induced by its environment to switch from an initial conductive state to a non-conductive state, or to switch from an initial non-conductive state to a conductive state; (ii) interrogating the RFID sensor with the reader; and (iii) determining whether the sensing element has changed from its initial condition.

The buried structure can be, for example, underground or underwater. Optionally, the buried structure is a pipeline or a storage container.

BRIEF DESCRIPTION OF TABLES AND FIGURES

For a better understanding of the application as described herein, as well as other aspects and further features thereof, reference is made to the following description which is to be used in conjunction with the accompanying drawings, where:

Figure 7:
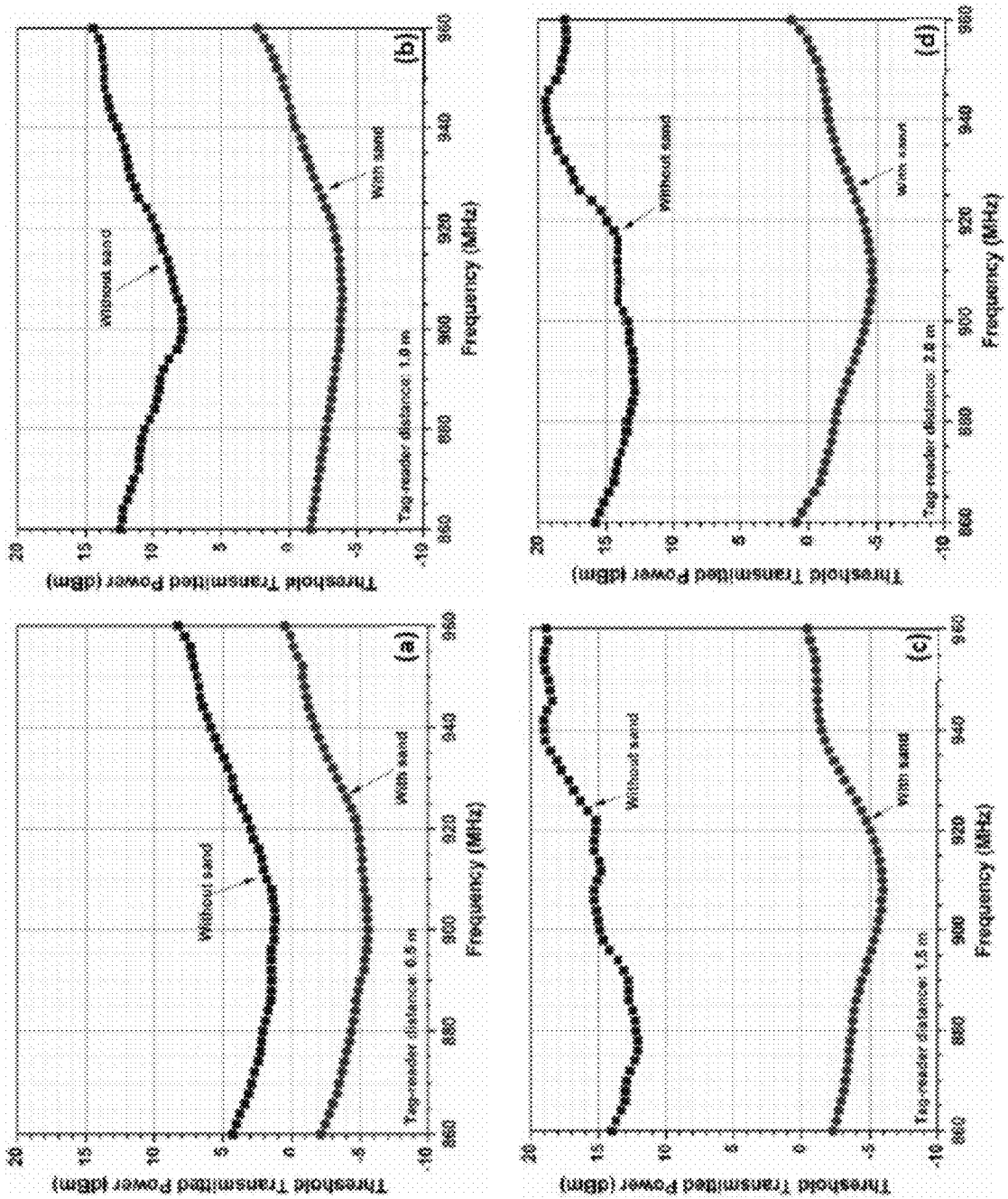
Figure 8:
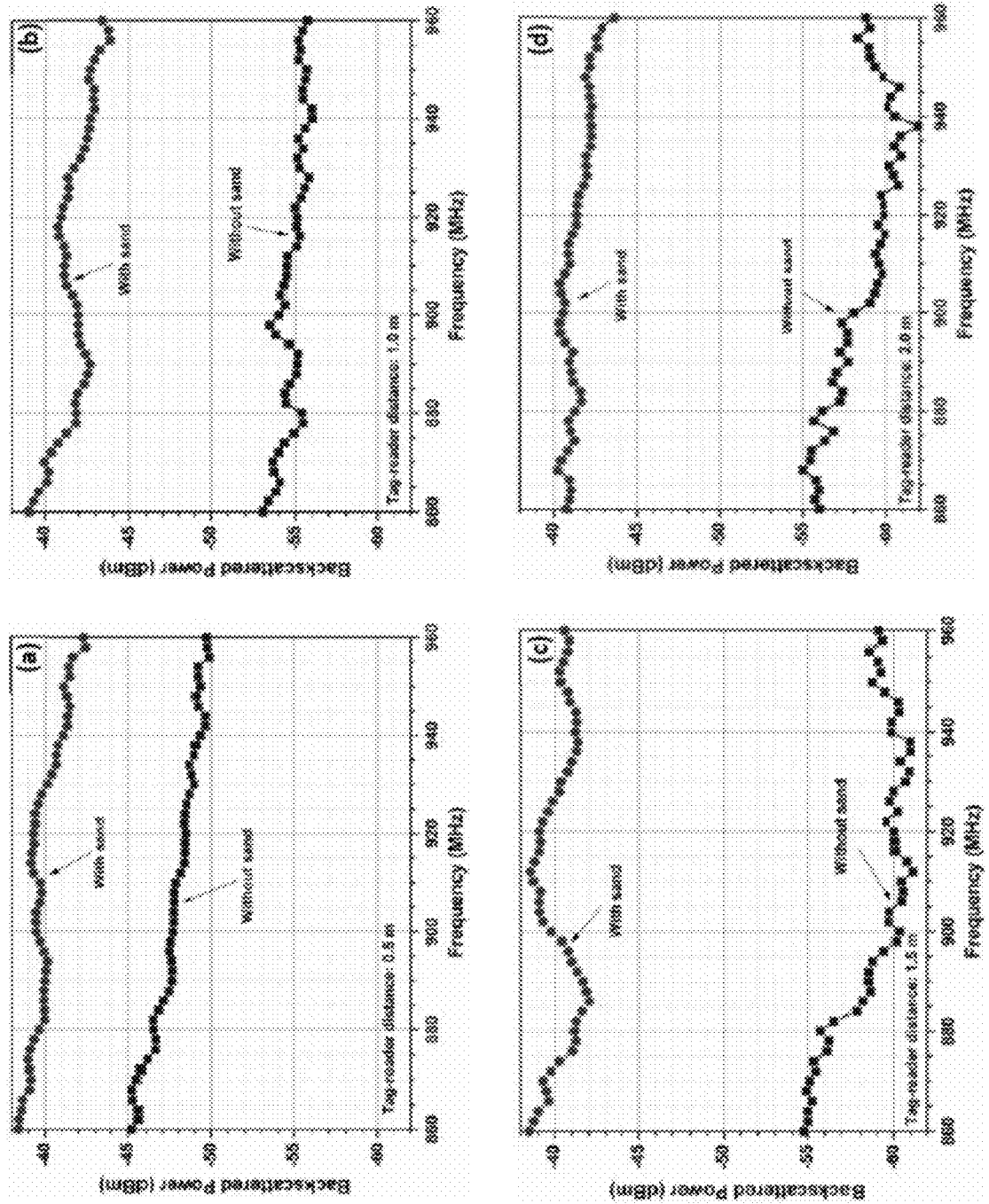
Figure 9:
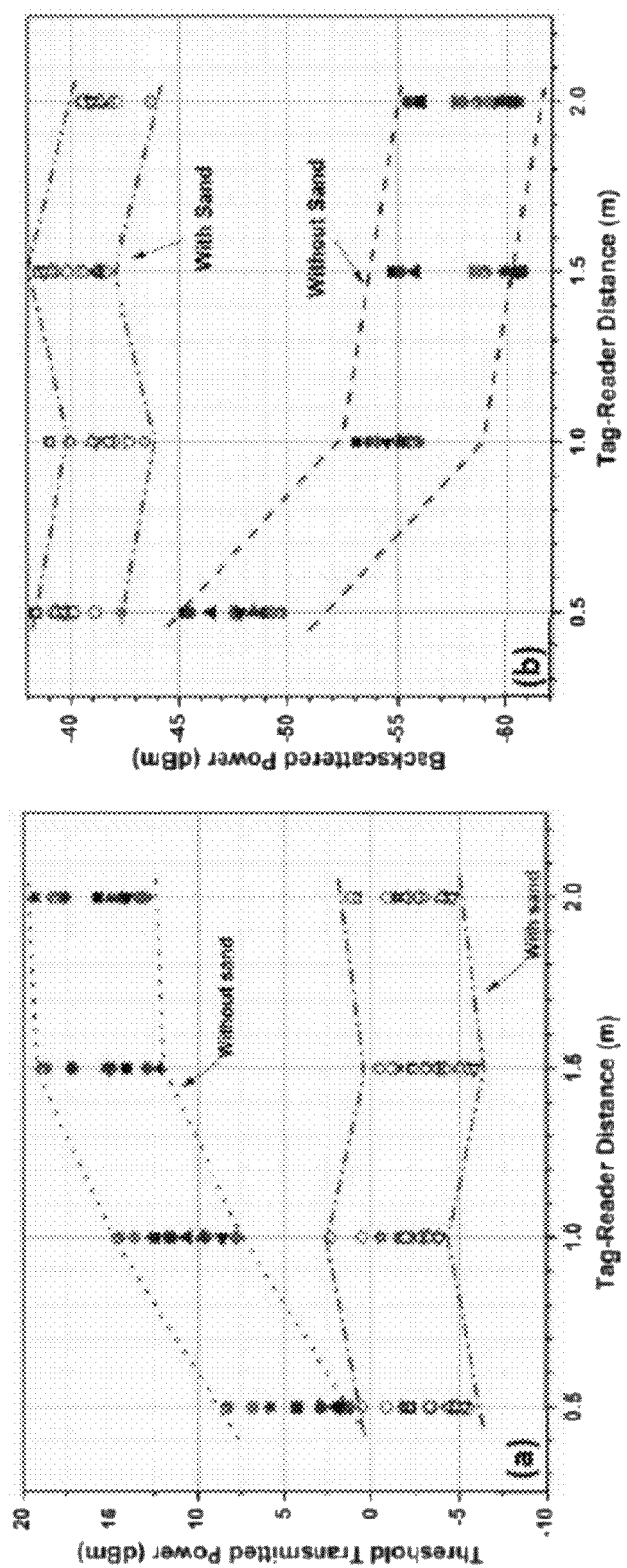
Figure 10:
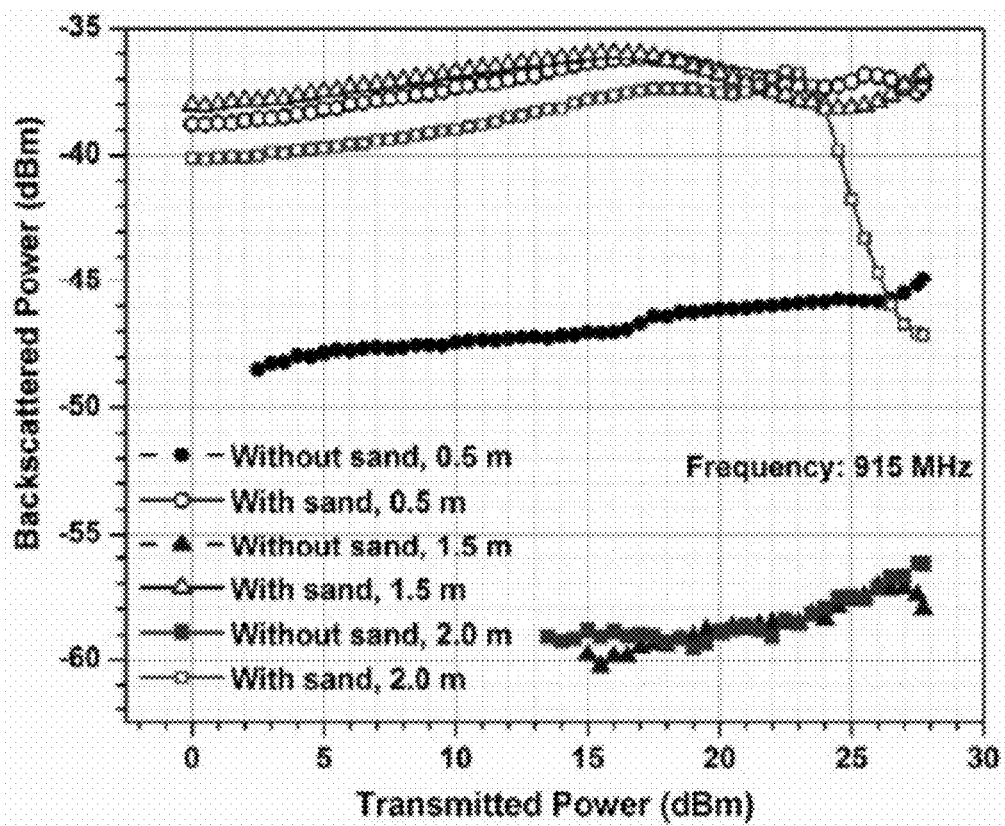
Figure 11:
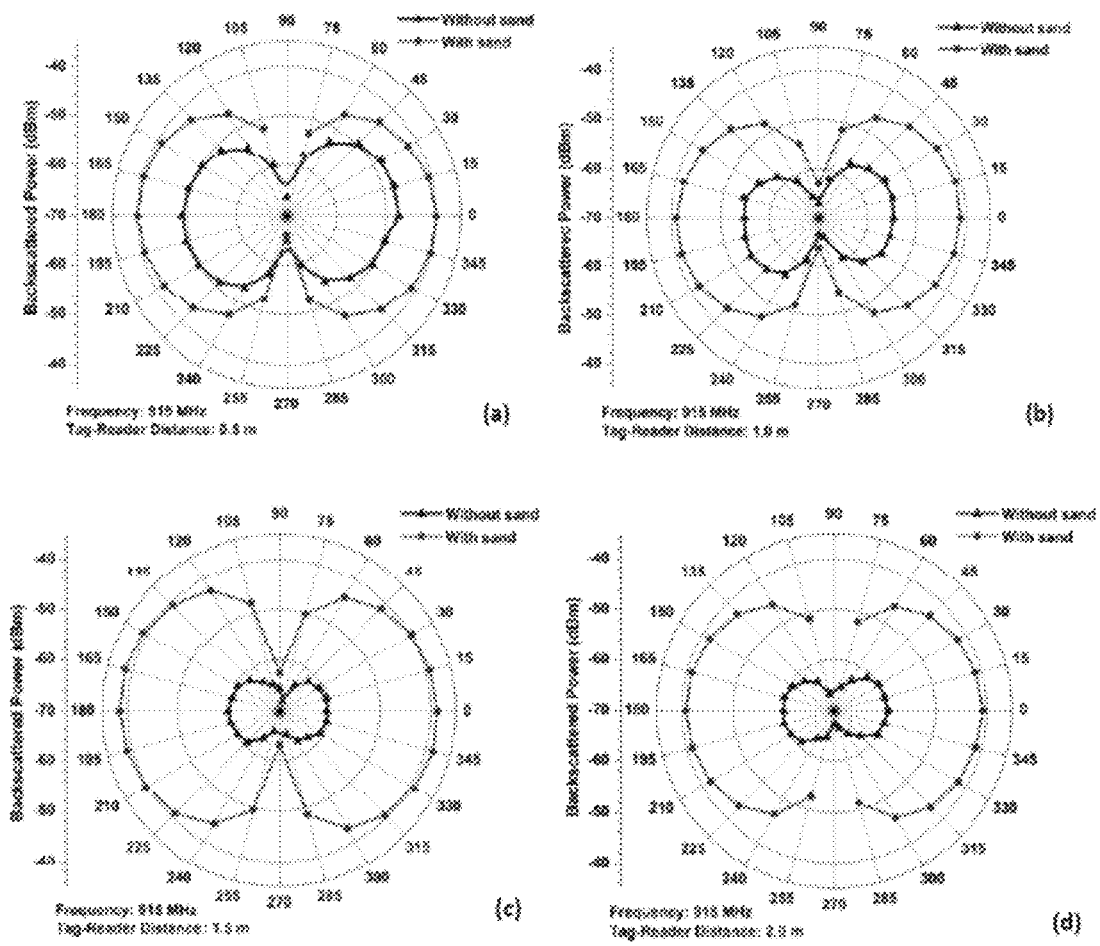
Figure 12:
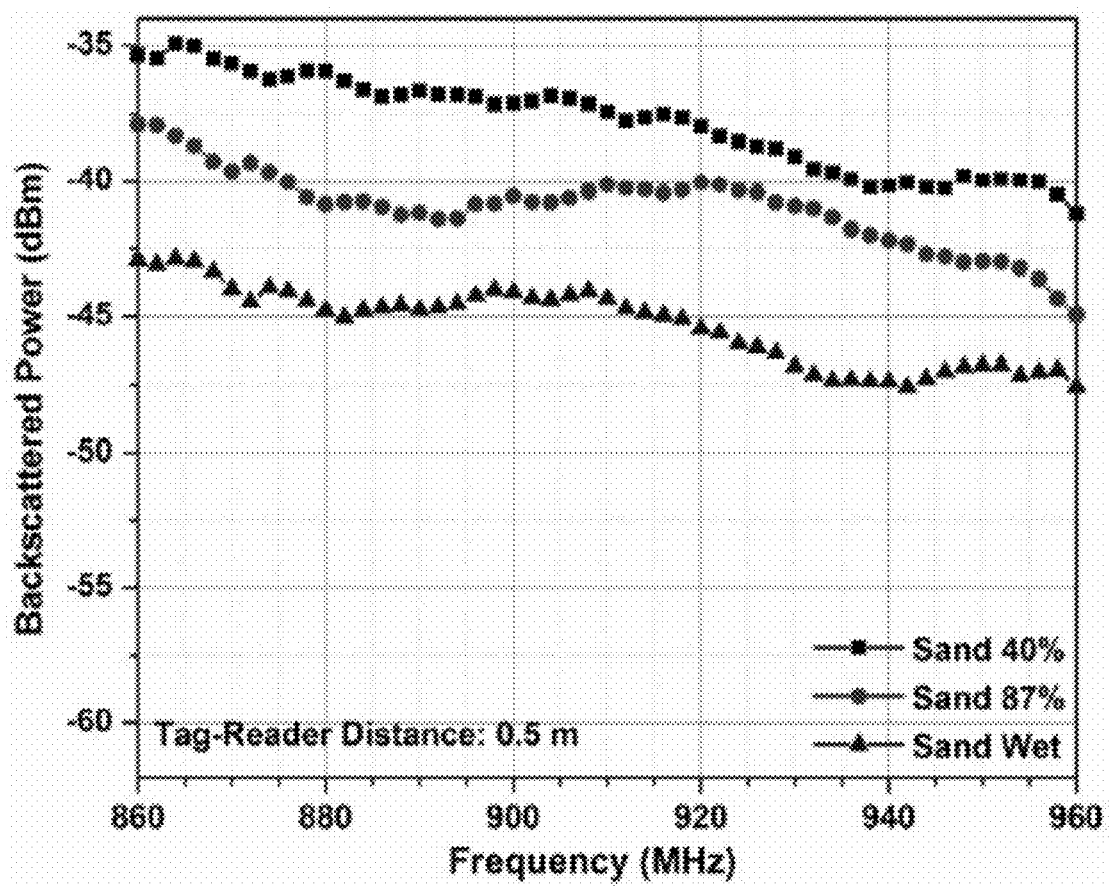
Figure 13:
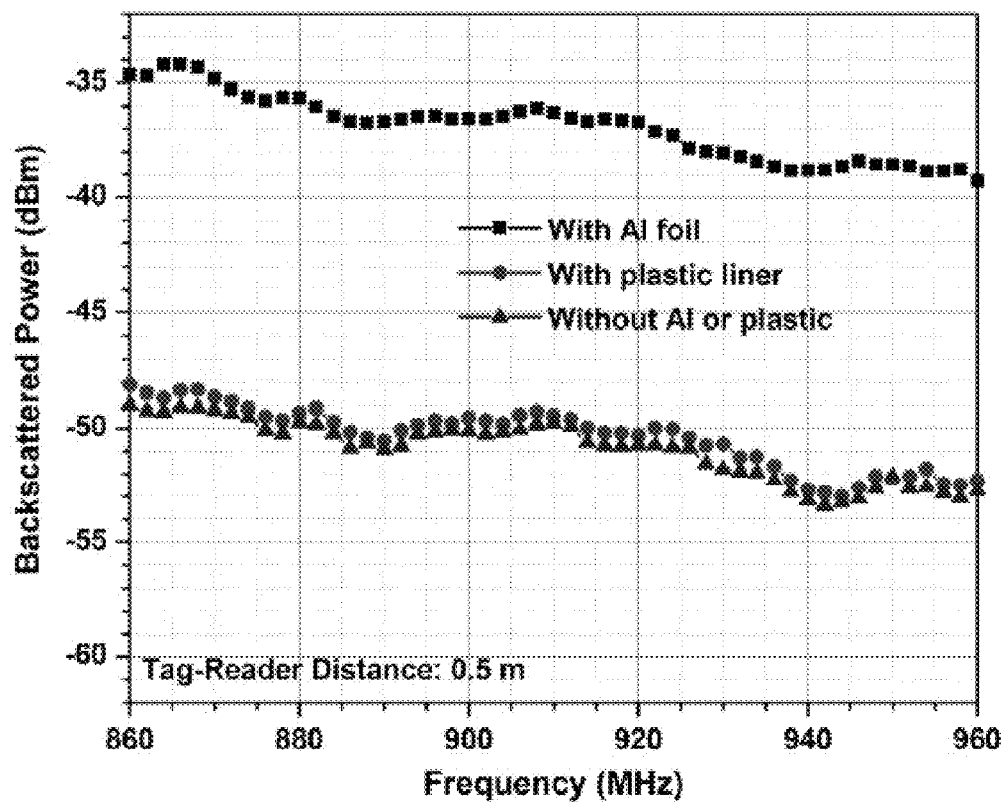
Figure 14:
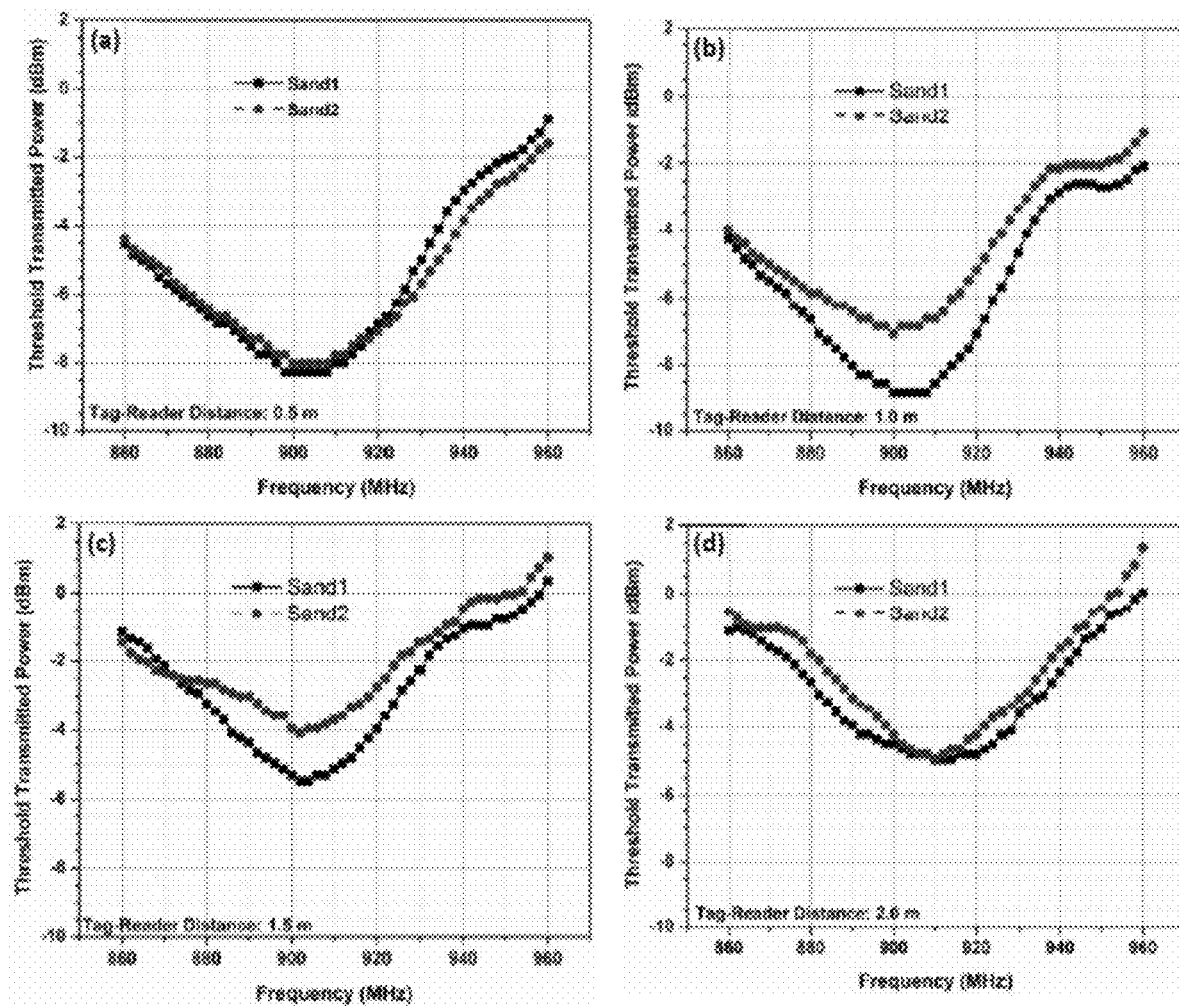
Figure 15:
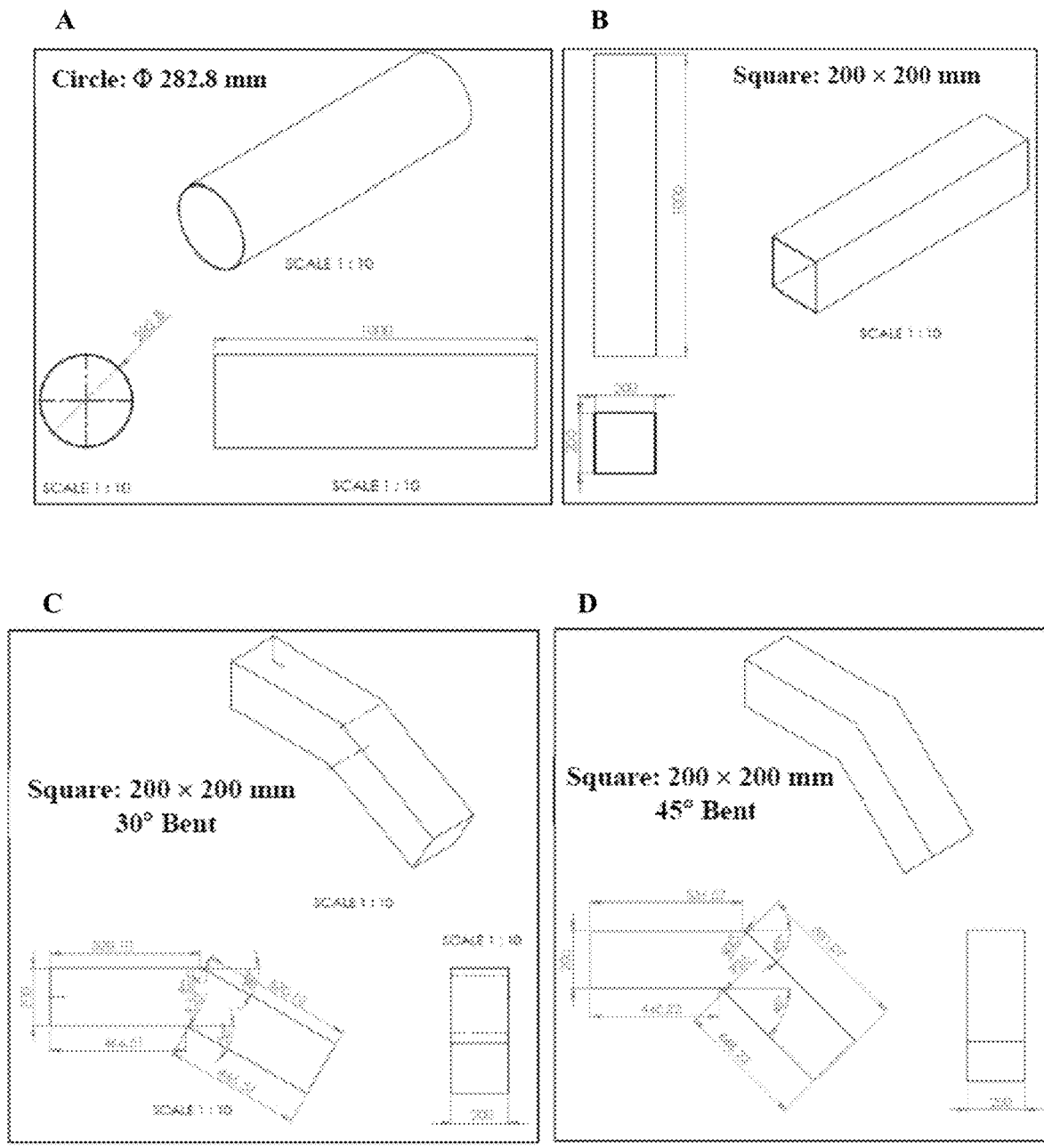
Figure 16:
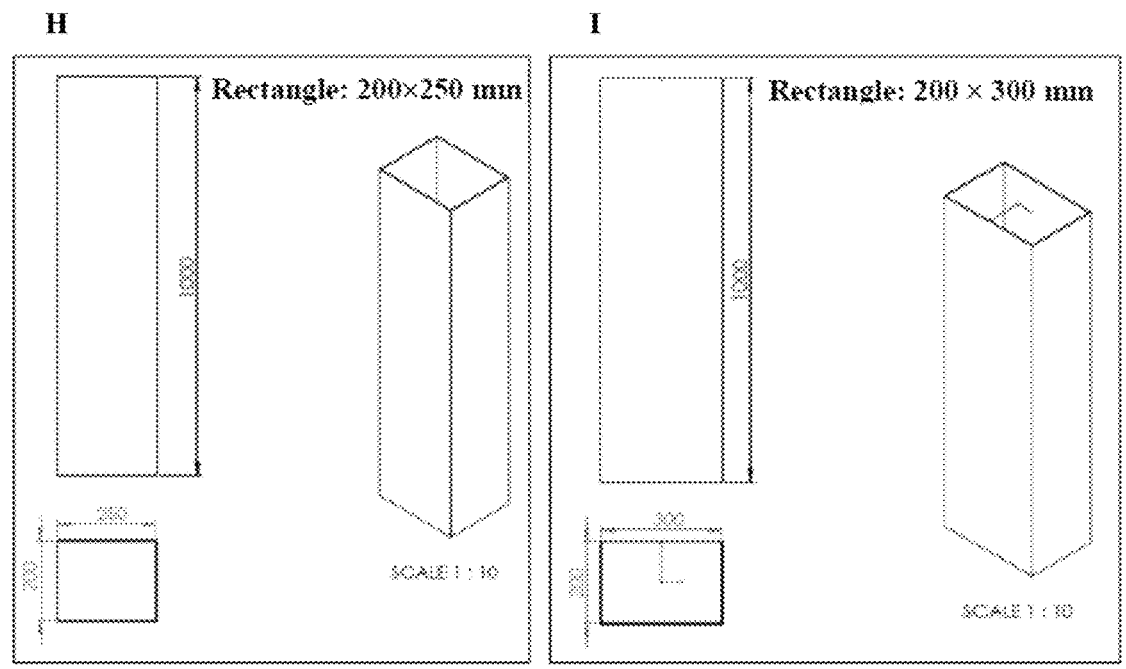
Figure 16:
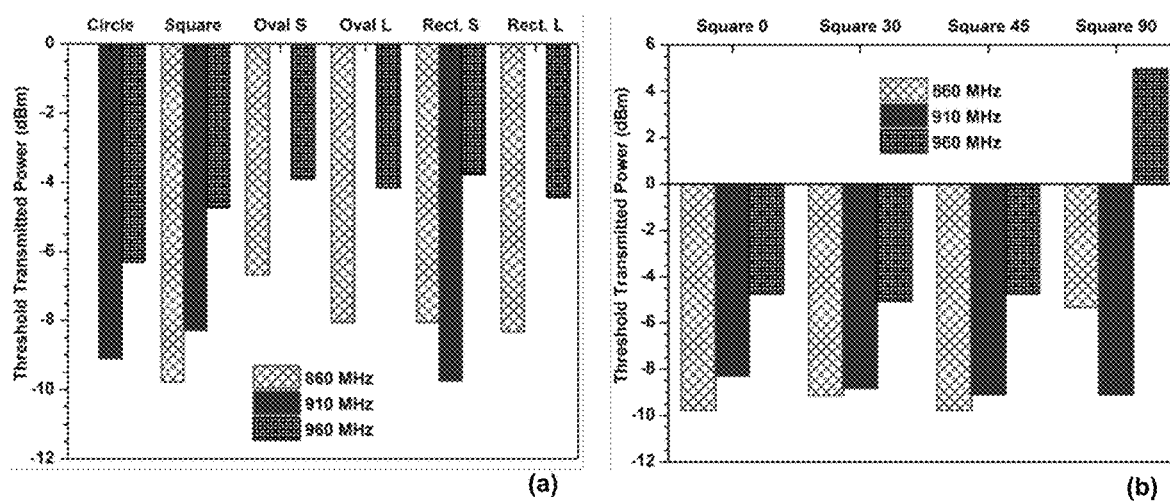
Figure 17:
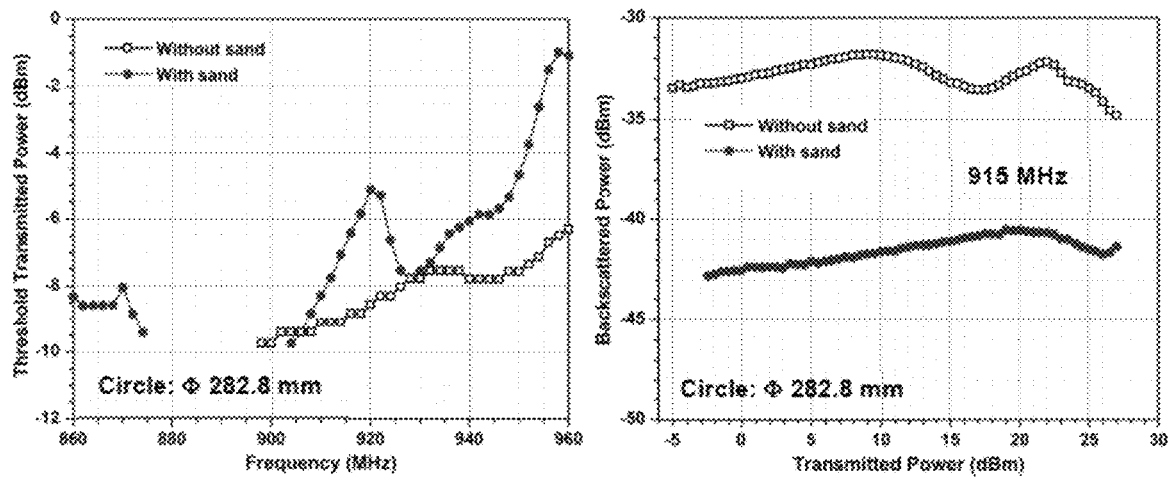
Figure 18:
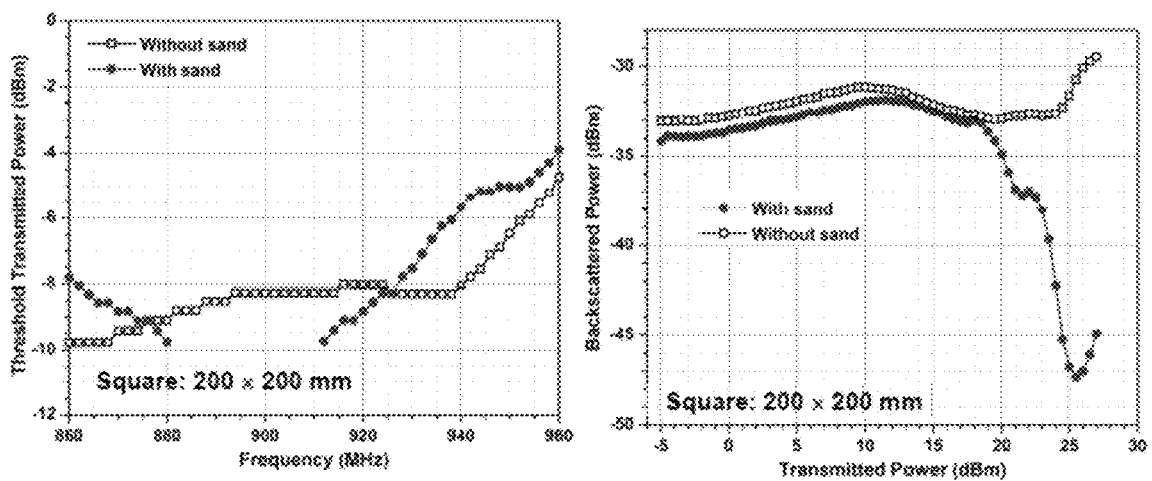
Figure 19:
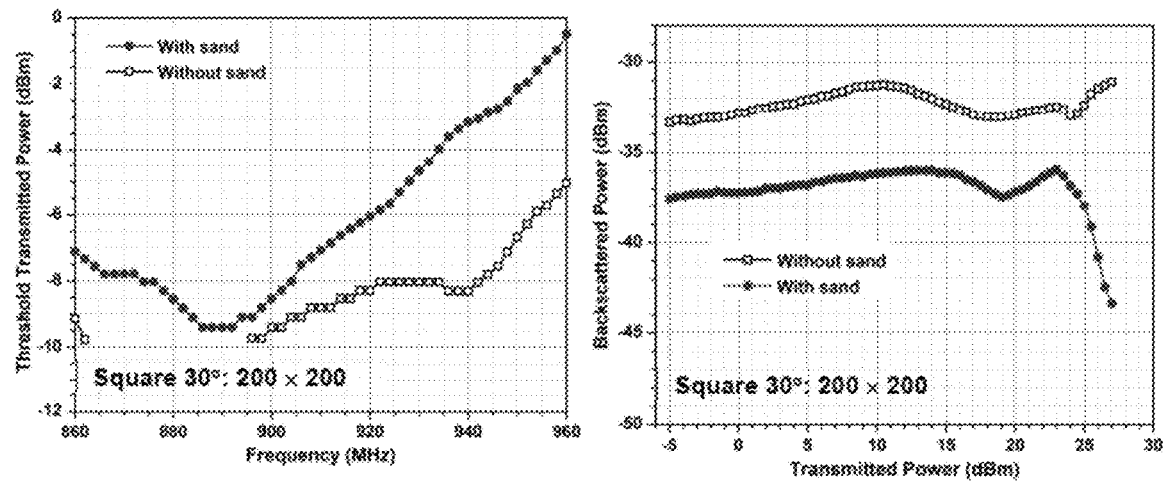
Figure 20:
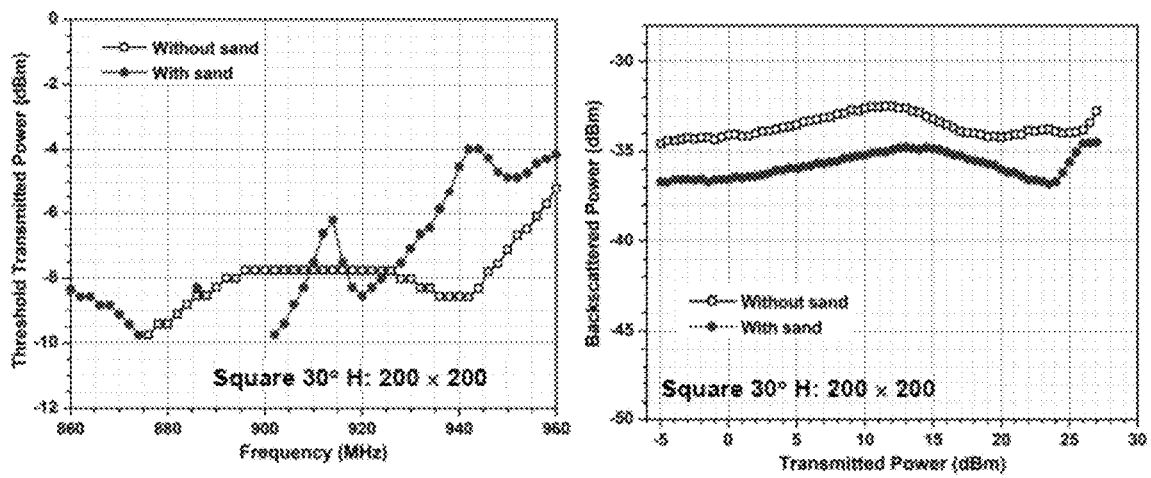
Figure 21:
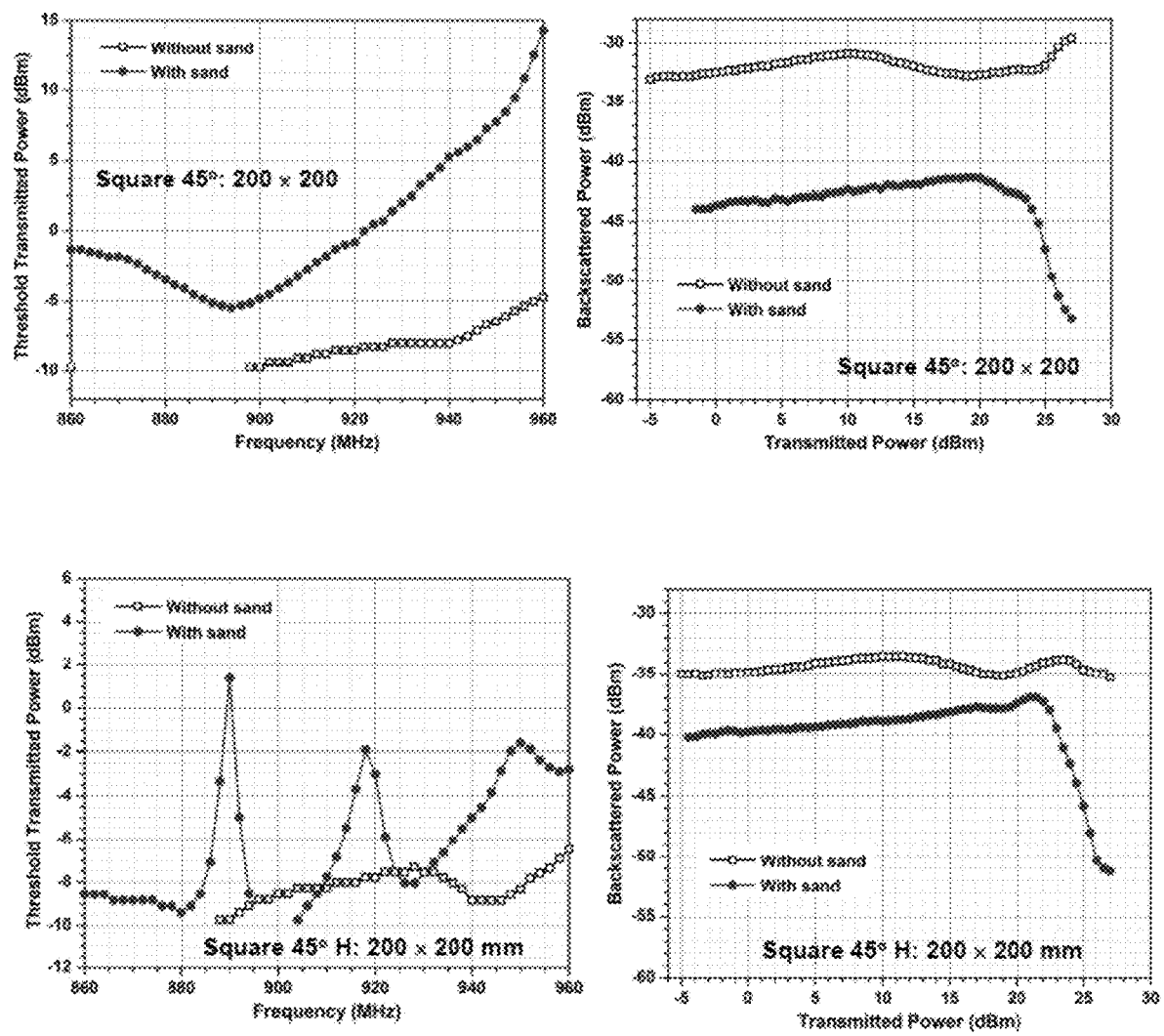
Figure 22:
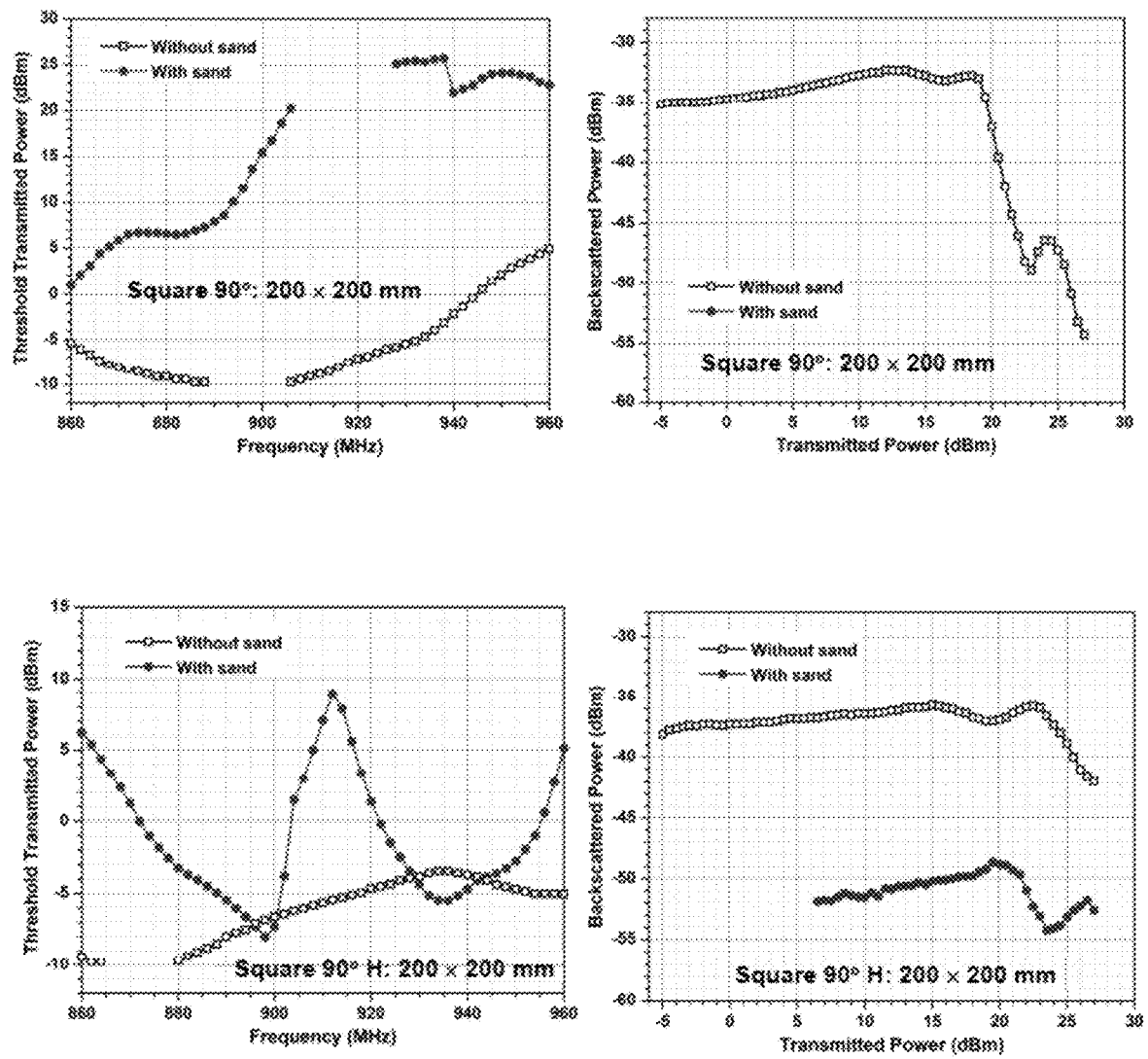
Figure 23:
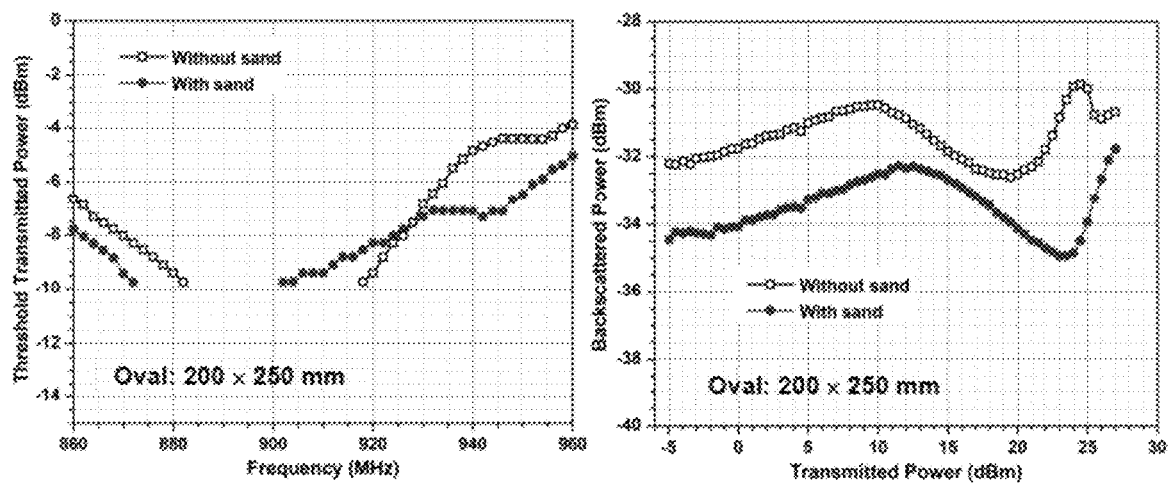
Figure 24:
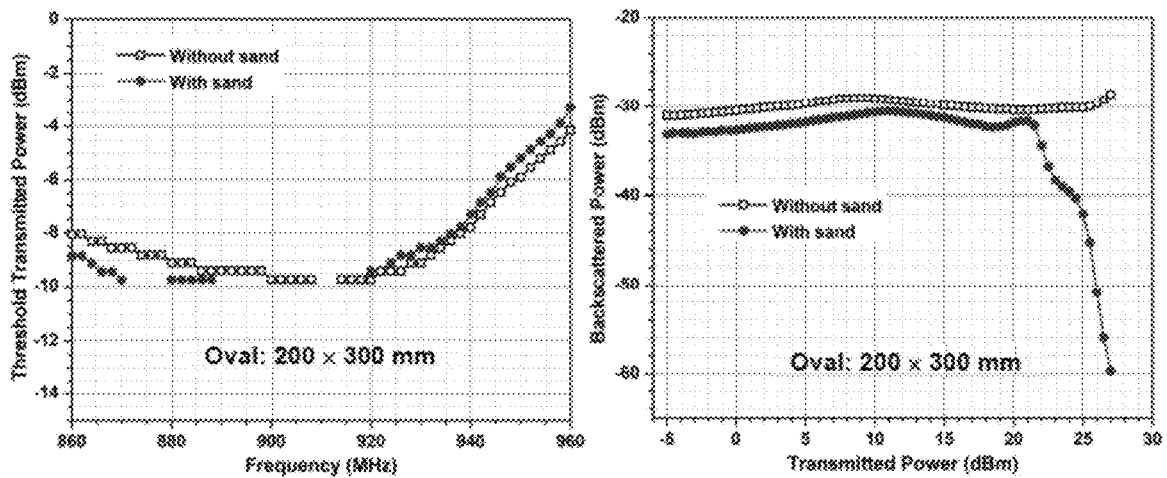
Figure 25:
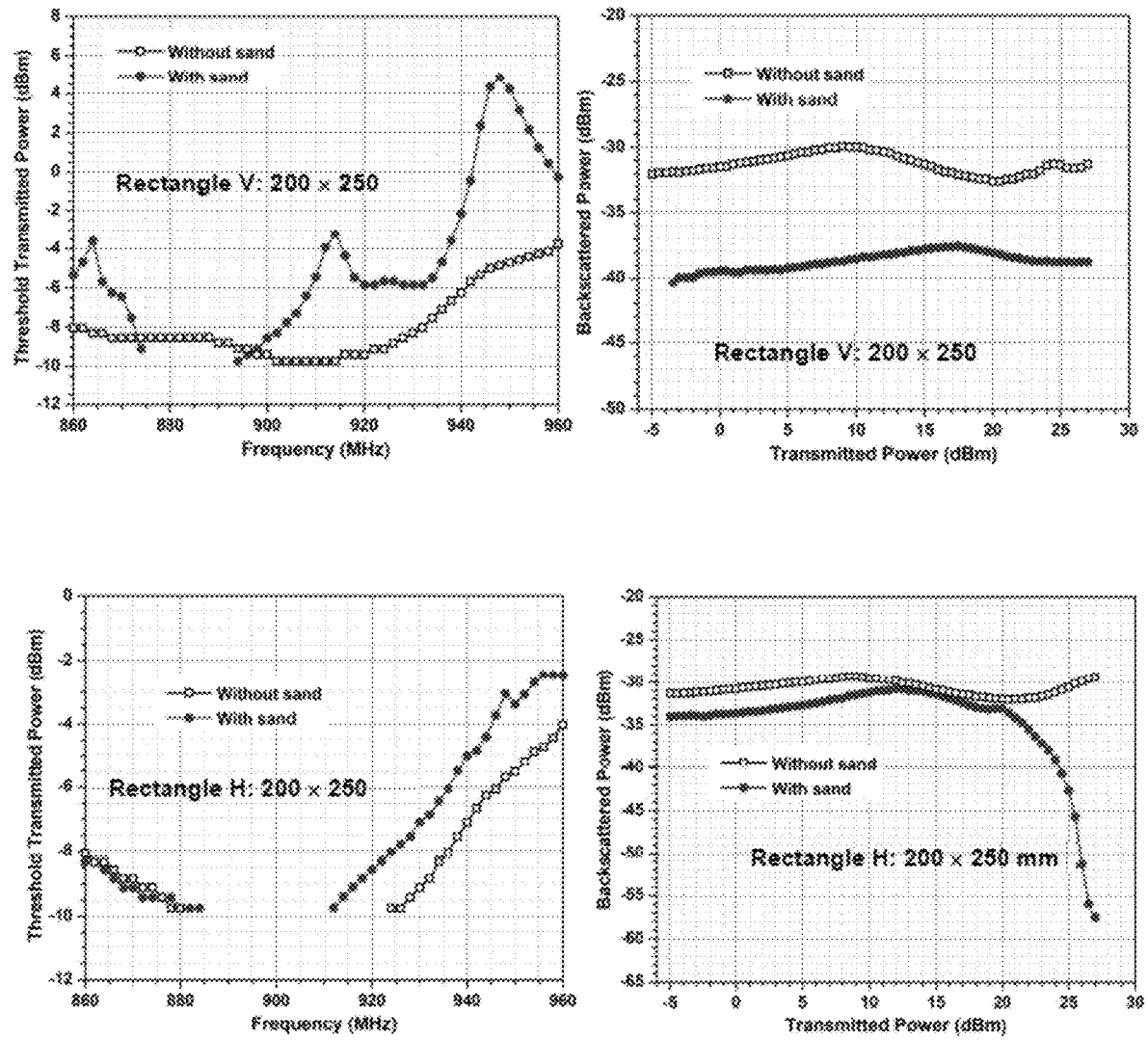
Figure 26:
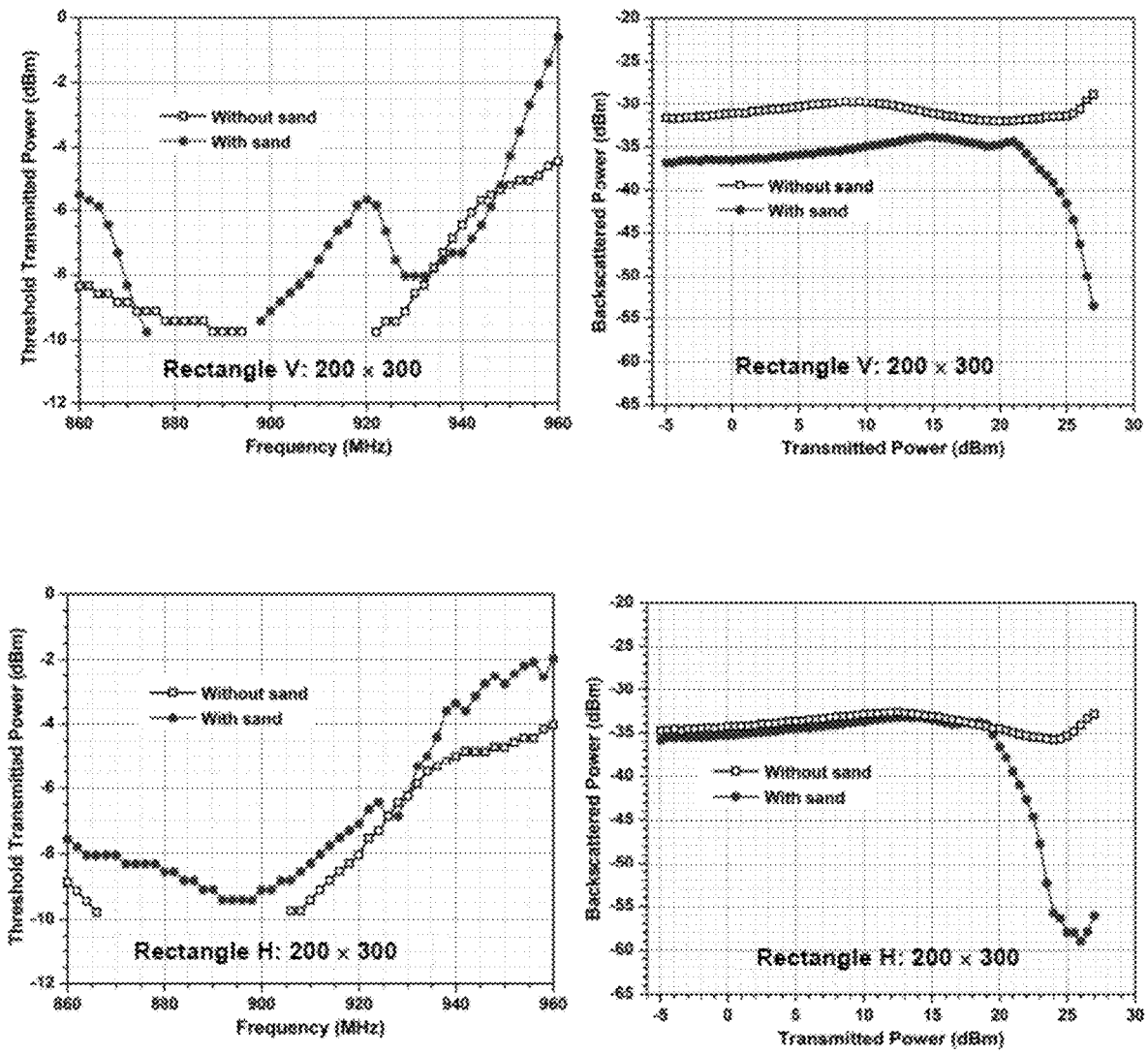
Figure 27:
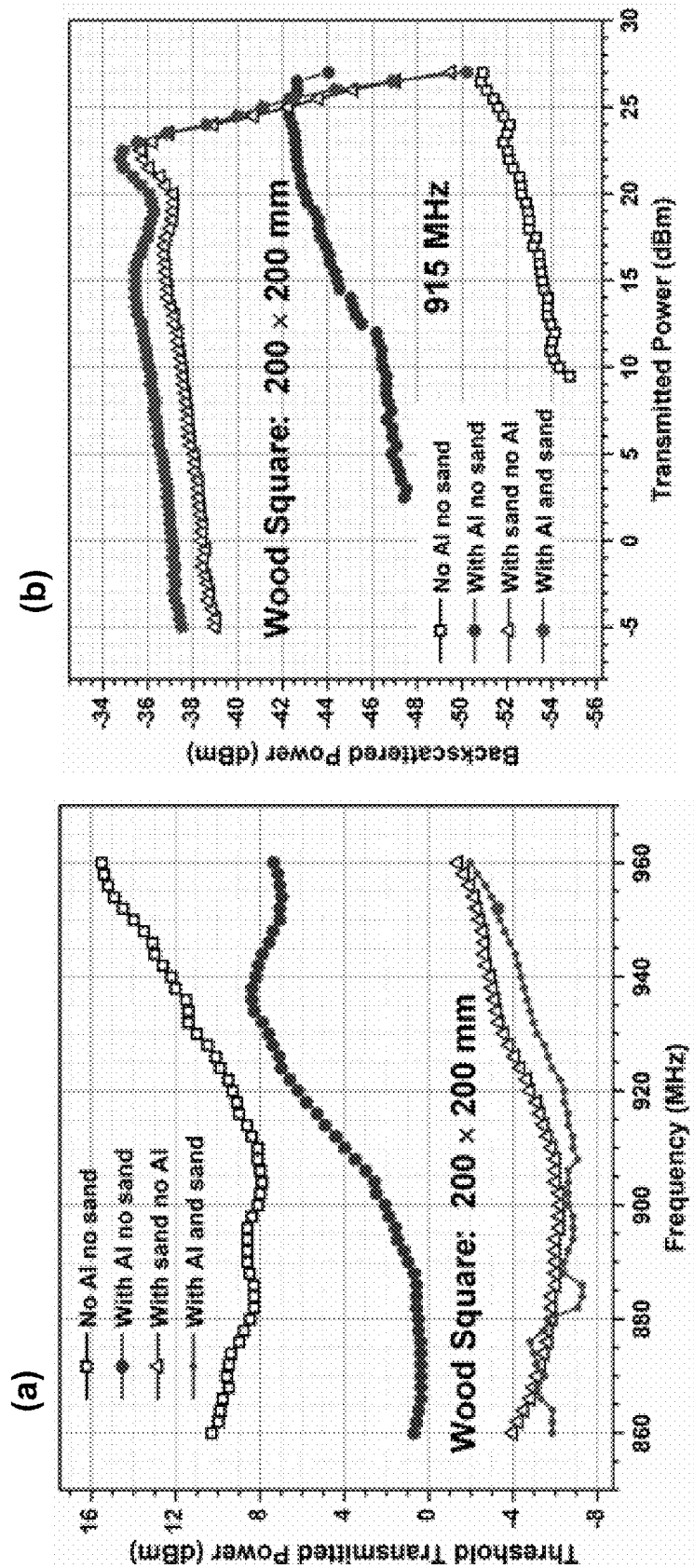
Figure 28:
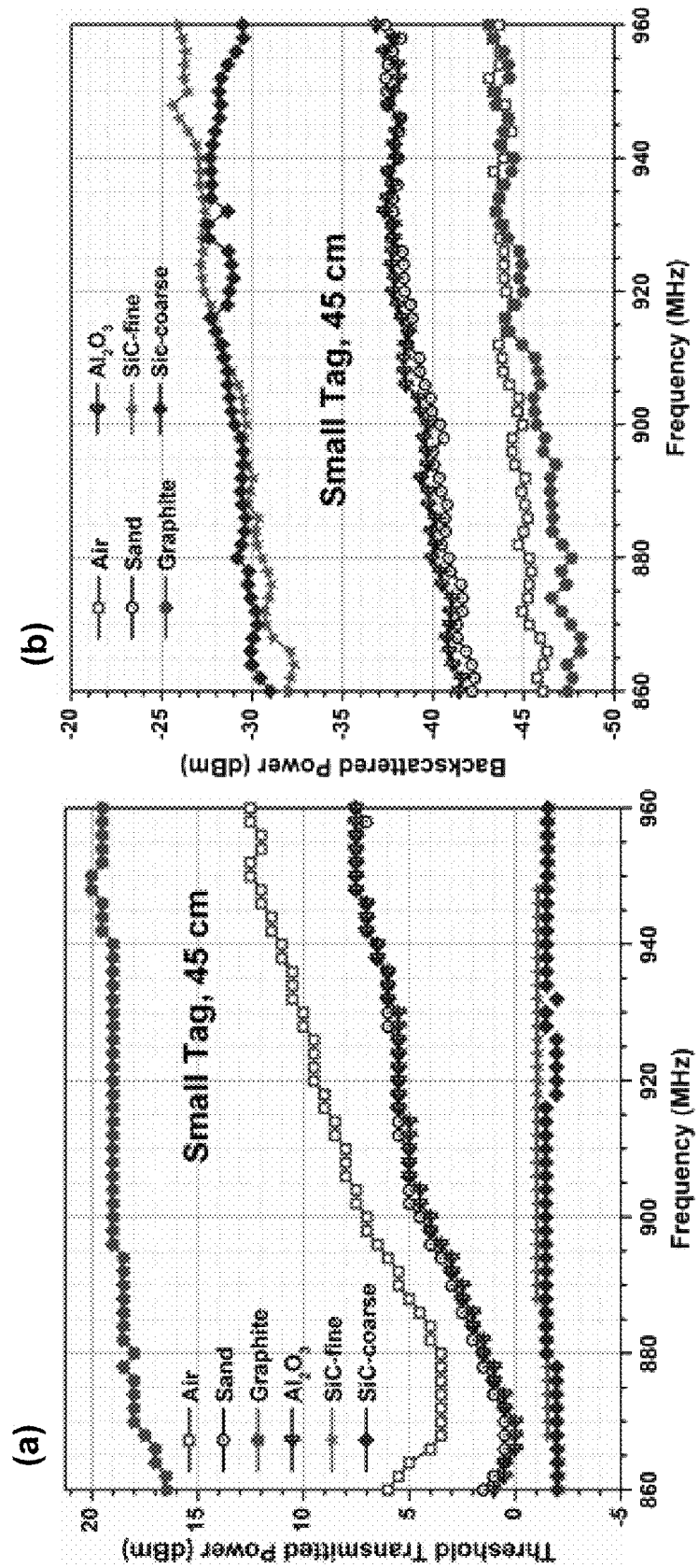

FIG. 7 graphically depicts threshold transmitted power measured at 860-960 MHz frequencies with or without sand in between the tag and reader (tag-reader distances: (a) 0.5 m, (b) 1.0 m, (c) 1.5 m and (d) 2.0 m);

FIG. 8 graphically depicts a comparison of the backscattered power at various distances for cases with and without sand in between the tag and the reader (tag-reader distances: (a) 0.5 m, (b) 1.0 m, (c) 1.5 m and (d) 2.0 m);

FIG. 9 graphically depicts a comparison of the reading performance at various distances for cases with and without sand in between the tag and the reader ((a) threshold transmitted power, (b) backscattered power corresponding to the threshold transmitted power);

FIG. 10 graphically depicts a comparison of the backscatter power sweep results at various distances for cases with and without sand in between the tag and the reader;

FIG. 11 graphically depicts a comparison of the orientation sweep results at various distances for cases with and without sand in between the tag and the reader (tag reader distances: (a) 0.5 m, (b) 1.0 m, (c) 1.5 m and (d) 2.0 m);

FIG. 12 graphically depicts the effect of the sand's relative humidity on reading performance;

FIG. 13 graphically depicts the effect of a conductive liner on reading performance; and FIG. 14 graphically depicts the effect of sand particle size on reading performance (tag reader distances: (a) 0.5 m, (b) 1.0 m, (c) 1.5 m and (d) 2.0 m; Sand 1=160 μm and Sand 2=210 μm);

FIGS. 15 (A)-(I) schematically depict channels of different shapes and dimensions used in systems according to certain embodiments (A straight, circular cross-section; B straight, square cross-section; C 30° bend, square cross-section; D 45° bend, square cross-section; E 90° bend, square cross-section; F straight, oval cross-section; G straight, oval cross-section; H straight, rectangular cross-section; I straight, rectangular cross-section);

FIG. 16 graphically depicts a comparison of the effect of channel shape and bending angle on the signal strength in a system according to certain embodiments: (a) cross-section shape and (b) bending angle of the channel;

FIG. 17 graphically depicts a comparison of threshold transmitted power measured at 860-960 MHz frequencies and backscattered power measured for steel channel having a circular cross-sectional shape, either empty or filled with sand;

FIG. 18 graphically depicts a comparison of threshold transmitted power measured at 860-960 MHz frequencies and backscattered power measured for steel channel having a square cross-sectional shape, either empty or filled with sand;

FIG. 19 graphically depicts a comparison of threshold transmitted power measured at 860-960 MHz frequencies and backscattered power measured for steel channel having a square cross-sectional shape, either empty or filled with sand, where the measurement is perpendicular to the bending plane;

FIG. 20 graphically depicts a comparison of threshold transmitted power measured at 860-960 MHz frequencies and backscattered power measured for steel channel having a square cross-sectional shape and a 30° bend, either empty or filled with sand, where the measurement "H" is parallel to the bending plane;

FIG. 21 graphically depicts a comparison of threshold transmitted power measured at 860-960 MHz frequencies and backscattered power measured for steel channel having a square cross-sectional shape and a 45° bend, either empty or filled with sand (the measurement "H" is parallel to the bending plane, while the other is perpendicular to it);

FIG. 22 graphically depicts a comparison of threshold transmitted power measured at 860-960 MHz frequencies and backscattered power measured for steel channel having a square cross-sectional shape and a 90° bend, either empty or filled with sand (the measurement "H" is parallel to the bending plane, while the other is perpendicular to it);

FIG. 23 graphically depicts a comparison of threshold transmitted power measured at 860-960 MHz frequencies and backscattered power measured for steel channel having an oval cross-sectional shape (200×250 mm), either empty or filled with sand;

FIG. 24 graphically depicts a comparison of threshold transmitted power measured at 860-960 MHz frequencies and backscattered power measured for steel channel having an oval cross-sectional shape (200×300 mm), either empty or filled with sand;

FIG. 25 graphically depicts a comparison of threshold transmitted power measured at 860-960 MHz frequencies and backscattered power measured for steel channel having rectangular cross-sectional shape (200×250 mm), either empty or filled with sand (the measurement "H" is parallel to the long side (250 mm) of the rectangle, while the "V" is parallel to the short side (200 mm));

FIG. 26 graphically depicts a comparison of threshold transmitted power measured at 860-960 MHz frequencies and backscattered power measured for steel channel having rectangular cross-sectional shape (200×300 mm), either empty or filled with sand (the measurement "H" is parallel to the long side (300 mm) of the rectangle, while the "V" is parallel to the short side (200 mm);

FIG. 27 graphically depicts the combined effect of metal liner and sand on signal strength in a system according to certain embodiments: (a) threshold transmitted power, (b) backscattered power (reading distance: 1 m); and FIG. 28 graphically depicts the effect of the nature of particulate material on the signal strength in a system according to certain embodiments: (a) threshold transmitted power, (b) backscattered power (small tag, reading distance: 0.45 m).

DETAILED DESCRIPTION

Definitions

Unless defined otherwise, all technical and scientific terms used herein have the same meaning as commonly understood by one having ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

The present application provides a wireless sensor device that is based on radio frequency identification (RFID) technology. The device comprises an RFID sensor that includes at least one antenna configured to receive an interrogation signal from a reader and to transmit a response signal to the reader; at least one integrated circuit (IC) connected to the at least one antenna; and at least one sensing element between the antenna and the IC. The wireless sensor device of the present application further comprises a channel for directing transmission of signals between the antenna and the reader. The RFID sensor is attached or directly adjacent to one end of the channel. In response to changes caused by the environment the sensing element will switch from a conductive state to a non-conductive state, or from a non-conductive state to a conductive state.

The RFID sensor is designed to be buried underground, or underwater, close to the structure that requires monitoring (e.g., a pipeline or a storage container, such as a hazardous waste storage container).

In some embodiments, the present RFID sensor uses RF frequencies in the ultrahigh (860-960 MHz) range (or even higher, e.g. microwave) where the read distance (without battery or power) is usually in the range of a few meters to ~10 meters. This is in contrast to the use of low to high frequencies as in most of the current sensors, where the read distance is usually much less than 1 meter.

RFID Sensor

The RFID sensor comprises a sensing element that can be configured to monitor the corrosion of a structure, or to detect leakage from a structure, or both.

For corrosion monitoring, in one embodiment, the sensing element is made of a conductive, corrodible material, which is the same as or similar to the material of the structure to be monitored. The sensing element is integrated into the RFID sensor, as a short circuit between the IC chip and the antenna. As a result, the RFID antenna is not connected to the IC chip due to the short circuit provided by the sensing element, such that the RFID sensor is not readable if the sensing element is conductive (not broken). The sensing element is exposed to the environment while the other parts of the sensor are maintained in a stable environment. For example, the other parts of the RFID sensor can be sealed, for example, in a plastic case, to prevent corrosion.

Corrosion of the sensing element results in the "break" of the short circuit between the IC chip and the antenna, which results in the electrical connection of the IC chip to the antenna to enable normal communication between the RFID sensor and the reader. In use, the operator is informed that a certain amount of corrosion has accumulated if the sensing element has been completely corroded and the short circuit between the IC and the antenna has broken.

Corrosion of the sensing element results in the "change" of the short circuit between the IC chip and the antenna from a conductive state to a non-conductive state, which results in the electrical connection of the IC chip to the antenna to enable normal communication between the RFID sensor and the reader. In use, the operator is informed that a certain amount of corrosion has accumulated if the sensing element has been corroded to lead to the change from conductive to non-conductive, resulting in the "break" of the short circuit between the IC and the antenna.

In another embodiment, the sensing element is made of a non-conductive material, which is able to react with the environment and becomes conductive if a certain level of corrosion occurred. The sensing element is integrated into the RFID sensor as a short circuit between the IC chip and the antenna (initially not effective since it is non-conductive). As a result, the RFID antenna is initially connected to the IC chip and the RFID sensor is readable if the sensing element is not corroded (non-conductive). The sensing element is exposed to the environment while the other parts of the sensor are maintained in a stable environment. For example, the other parts of the RFID sensor can be sealed, for example, in a plastic case, to prevent corrosion.

Corrosion of the sensing element results in the "connection" of the short circuit between the IC chip and the antenna, which results in the "break" of the electrical connection of the IC chip to the antenna, disenabling the normal communication between the RFID sensor and the reader. In use, the operator is informed that a certain amount of corrosion has accumulated if the sensing element has been corroded and the short circuit between the IC and the antenna has been connected.

The sensing element is manufactured such that the "break" or "connection" in the short circuit is indicative of a predetermined level of corrosion in the structure being monitored. The predetermined level will be based on various factors specific to the particular structure being monitored and/or its use and environment. For example, the predetermined level of corrosion can be selected such that it corresponds with a level of corrosion that occurs prior to failure of the structure so that appropriate repairs or replacement can be performed in advance of environmental or system damage.

In one embodiment, the RFID sensor comprises multiple IC chips connected with different sizes of sensing elements. This configuration allows the operator to monitor the progress of corrosion of the structure being monitored, since these chips will switch on at different times depending on the degree of corrosion and the corrosion rate.

For the detection of leaks from a structure being monitored, a similar concept is applied. In this aspect, the sensing element comprises a material that is originally conductive or non-conductive and once the leaked substance reacts with the sensing element, the material becomes non-conductive or conductive, respectively, thereby cutting off or connecting the short circuit between the IC chip and the antenna to enable or disable normal communication between the sensor and the reader.

Similar to the sensing element employed in monitoring corrosion, the leak-detecting sensing element is designed to switch from a conductive state to a non-conductive state, or from a non-conductive state to a conductive state, when a predetermined level of leaked substance is present. In one embodiment, the RFID sensor comprises multiple IC chips connected with different sizes of sensing elements. This configuration allows the operator to monitor the progress of leakage from the structure being monitored, since these chips will switch on or off at different times depending on the degree of leakage and the leakage rate.

Transmission Channel

In order for the present RFID sensor to function underground or underwater, it is necessary for the sensor to include a free passage or channel through which the reader can interrogate the sensor, since line-of-sight propagation is characteristic of radio frequency (i.e., the radio wave travels in a direct path from the source to the receiver). Accordingly, the RFID sensor device of the present invention comprises a channel (e.g., a tube or tunnel) that creates a path for transmission of the RFID signal. The channel can be straight, or it can be curved or bent, depending on, for example, the environment of the structure being monitored.

In one embodiment, the channel is a tube or tunnel, made of any material (e.g., plastic, plexiglass, metal, wood, etc.), that defines a signal path. It is well known that water significantly absorbs RFID signal (including in the ultrahigh frequency range) and can, therefore, substantially shorten the read distance. Since water is obviously present for underwater structures and is also present in the soil surrounding most underground structures, it is necessary to avoid the introduction of water or moisture in the channel. Accordingly, the two ends of the channel are sealed to ensure that the channel remains free of water or debris that could accumulate and block or interfere with the path of signal transmission.

The channel can be formed from a continuous tube or tunnel, or it can be formed from two or more connected tubes or tunnels.

In certain embodiments, the channel is formed from a generally cylindrical tube or tunnel, or a combination of connected generally cylindrical tubes or tunnels. In other embodiments, the channel is formed from one or more alternatively-shaped tubes or tunnels, such as square-shaped tubes or tunnels, oval-shaped tubes or tunnels, rectangular-shaped tubes or tunnels, and so on. As would be readily appreciated, the channel can be formed from a combination of differently shaped tubes or tunnels, provided that they are connected in such a manner that the interior channel remains sealed from the external environment.

In one embodiment, the channel is empty. In another embodiment, the channel is filled with a dry, particulate or granular material, or a combination of two or more dry, particulate or granular materials. The dry, particulate or granular material should be non-conductive, where the ability for a particulate or granular material to enhance transmission of the radio frequency signal increases as the material's electrical resistivity decreases.

The present inventors have surprisingly found that the use of dry, particulate or granular filler material can enhance transmission of the radio frequency signal. The use of the filler can also aid in balancing the external pressure on the wall(s) of the channel (e.g., as a result of the water or soil outside pressing on the tube or tunnel forming the channel), thus maintaining the tube/tunnel in a stress-free state. Again, the two ends of the tube are sealed to avoid the penetration of moisture or debris into the channel.

The dry particulate filler is made of non-conductive materials such as, but not limited to, sand ($SiO_2$), SiC, $Al_2O_3$, or the like. When used in referring to the filler material, the term "dry" means the relative humidity of the particulate material is less than 90%.

Irrespective of whether or not the channel is filled, the tube or tunnel optionally has a conductive inner surface. For example, the inner surface of the channel can be coated with a conductive coating or lined with a conductive material (such as metal foil, e.g., aluminum foil) if the material used to manufacture the channel is not conductive, so that the signal is reflected inside the tube, and continues travelling to the end of the tube where the reader interrogates with the sensor. In the embodiment in which the tube or tunnel is curved or bent (without particulate or granular filler) then a conductive inner liner may be necessary in order to deflect or direct the signal from one end of the tube or tunnel to the other end.

The following description is provided, with reference to the Figures, to describe specific embodiments of the present RFID wireless sensor device.

Figure 1:
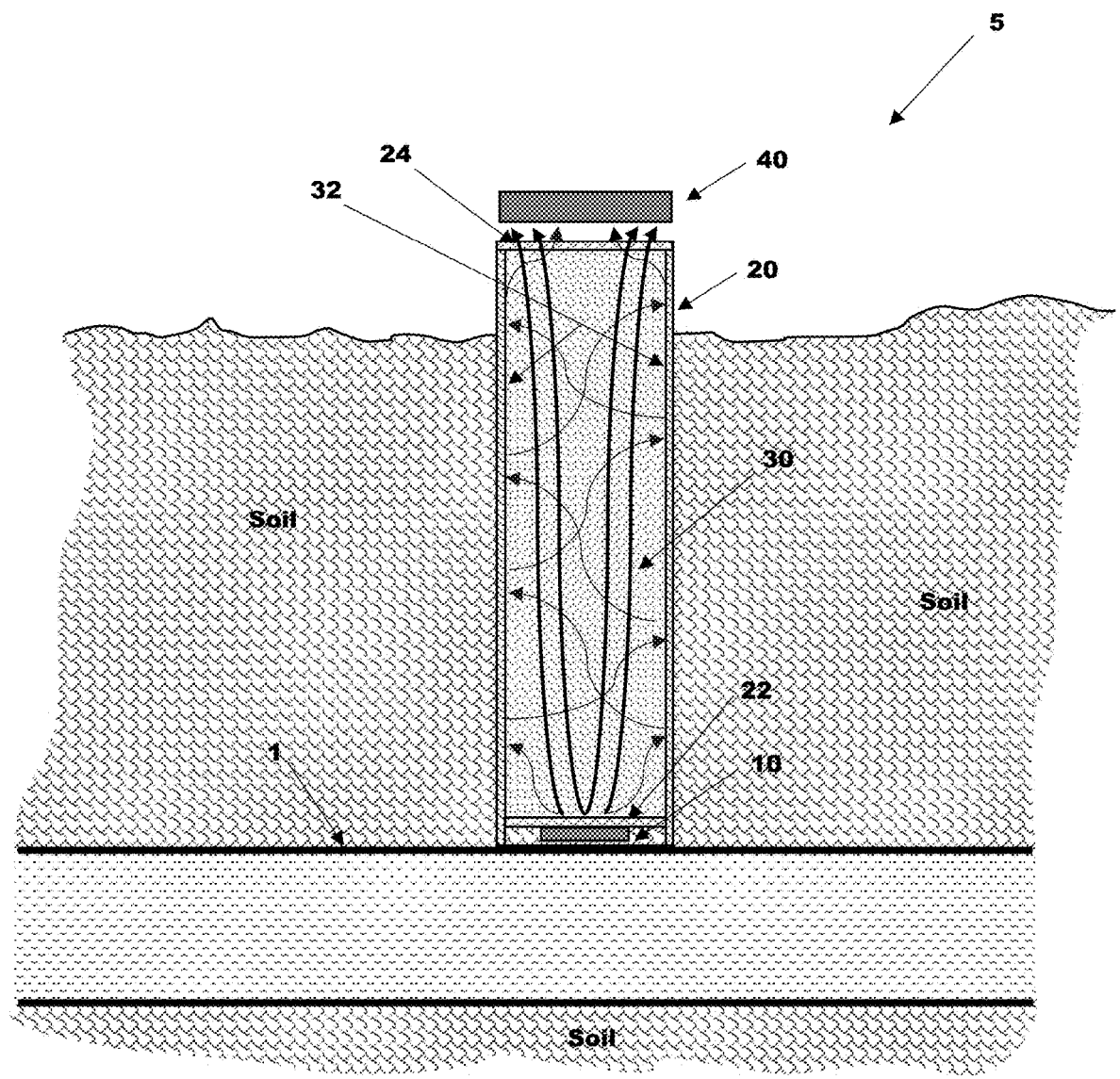
FIG. 1 is a schematic of an embodiment of an RFID wireless sensor device adjacent to an underground structure.

With reference to FIG. 1, the RFID wireless sensor device for monitoring the integrity of a buried or underwater structure 1 (e.g., monitoring corrosion or leakage) comprises an RFID sensor 10, a channel 20 for directing transmission of signals between RFID sensor 10 and a reader 40. Optionally, the channel comprises a filler material 30, such as dry sand.

As shown in FIG. 1, RFID sensor 10 is placed in close proximity to, and attached to the bottom of channel 20, but is outside of the sealed end 22. In this way, RFID sensor 10 is in contact with the environment, while the communication of RFID sensor 10 with reader 40 is not affected by the moisture or water that may exist in the environment. The sealed channel 20 provides a path for the communication between RFID sensor 10 and reader 40. The dry filler material 20 is used to enhance the transmission of the signal (thus increasing the read distance) while also reinforcing the structure of the tube or tunnel forming channel 20.

In the example shown in FIG. 1, RFID sensor 10 is interrogated by reader 40 from the top of the tube. During interrogation, reader 40 is positioned above the sealed end 24 of channel 20. In this configuration, no battery or power is required for the operation of RFID sensor 10, enabling long-term monitoring without changing or replacing the sensor. The operator may periodically bring reader 40 to the upper end of channel 20 to examine the integrity of the buried structure 1, for example, its corrosion status, or a reader 40 (powered by battery and charged by renewable energy, e.g. solar or wind) can be permanently or temporarily installed on the site to periodically (programmable) interrogate RFID sensor 10 and report the status of corrosion. It is also possible that reader 40 may be carried by a drone to conduct the interrogation. The testing results can be stored in the reader and retrieved by the operator, or they can be wirelessly transmitted, for example, via satellite, to the operator. The arrows within the channel in FIG. 1 are intended to depict signal being transmitted from RFID sensor 10 to reader 40.

Figure 2:
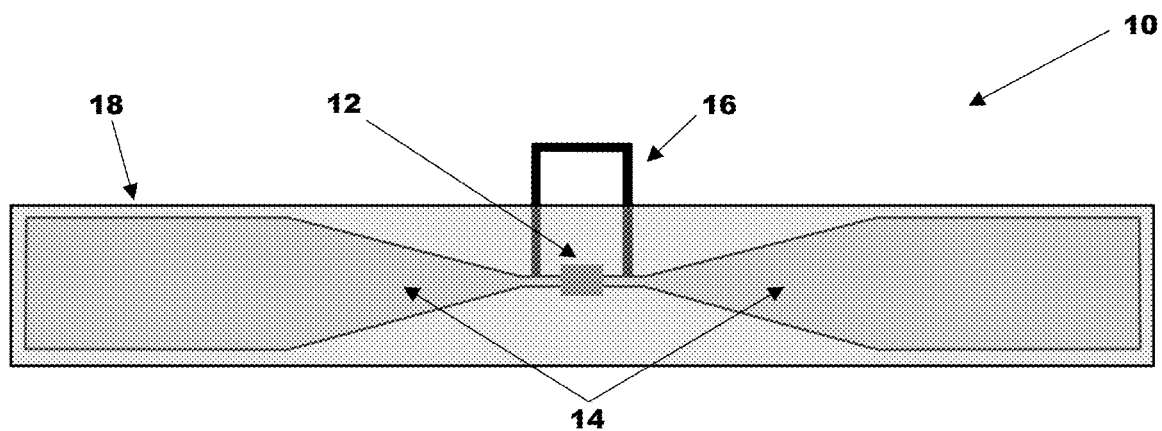
FIG. 2 is a schematic of an RFID sensor according to one embodiment.

With reference to FIG. 2, the monitoring RFID sensor 10 is composed of at least one IC chip 12, at least one antenna 14, and at least one sensing element 16 that is acting as a "short circuit" between IC chip 12 and the antenna 14. This configuration differs from typical wireless sensors where the sensing element is a "switch" between the IC chip and the antenna. In the present device, sensing element 16 functions as a "short circuit" between IC chip 12 and the antenna 14. In typical wireless sensors, the communication between the sensor and the reader is "on" at the beginning, since the sensing element provides normal connection between the IC chip and the antenna. Once the sensing element is affected by the environment and changes its status from conductive to nonconductive, it will switch "off" the sensor (another chip may be turned on). In contrast, in the present device, RFID sensor 10 is initially "off" or "on" depending on the conductivity of the sensing element 16. If sensing element 16 is initially conductive, then it enables the short circuit (sensor is "off") at the beginning. If sensing element 16 is initially non-conductive, then the short circuit is ineffective at the beginning (the sensor is "on"). When the sensing element 16 becomes non-conductive or conductive as a result of environmental effects, RFID sensor 10 is turned "on" or "off", respectively, and the status change can be detected through the reader.

If the sensing element 16 is initially conductive, while it remains intact, antenna 14 in RFID sensor 10 does not function as an antenna because of the short circuit caused by the presence of sensing element 16 in its conductive state. At that time, sensing element 16 essentially acts as an antenna. However, because sensing element 16 is small in size as compared to the regular antenna 14, it is essentially not readable at a distance that is greater than a few centimeters. Once sensing element 16 is changed to its nonconductive state (e.g., it is broken as a result of corrosion or contact with a leaked substance), the short circuit is open, and the inlay antenna 14 becomes functional such that communication is established between the reader and RFID sensor 10. This communication may be indicative of a certain amount of corrosion that has accumulated if sensing element 16 is designed for corrosion monitoring, or the leakage of some substance if sensing element 16 is designed for leak detection.

If the sensing element 16 is initially non-conductive, while it remains intact, RFID sensor 10 functions normally and can be interrogated by the reader. Once sensing element 16 is changed to a conductive state due to corrosion or reaction with the leaked substance, the short circuit is effective, and the inlay antenna 14 does not function as an antenna. At that time, sensing element 16 essentially acts as an antenna. However, because sensing element 16 is small in size as compared to the regular antenna 14, it is essentially not readable at a distance that is greater than a few centimeters, such that the communication between the reader and RFID sensor 10 is essentially disabled. This may be indicative of a certain amount of corrosion that has accumulated if sensing element 16 is designed for corrosion monitoring, or the leakage of some substance if sensing element 16 is designed for leak detection.

The RFID wireless sensor device of the present application can contain a single IC chip or multiple IC chips. Single chip sensors can be used to detect the degree of corrosion or leaking only to a specific, predetermined amount. This is because, once the corrosion or leaked substance has reached a certain, predetermined level, the sensing element is broken or converted to its non-conductive/conductive condition, resulting in the enabling/disabling of the communication between the sensor and the reader. The sensing element is not reversibly converted to its non-conductive/conductive condition; rather, this is a permanent switch. The amount of corrosion/leakage that can be detected is determined by the properties of the sensing element.

In another embodiment, the RFID wireless sensor device is configured to monitor the change in structure integrity as a cumulative change or rate of change (e.g., the accumulation of corrosion or the corrosion rate, or the degree of leakage or the rate of leakage). In this embodiment, the device comprises two or more IC chips integrated into the RFID sensor. The two or more IC chips can share the same antenna, or they can each have their own antennae.

Figure 3:
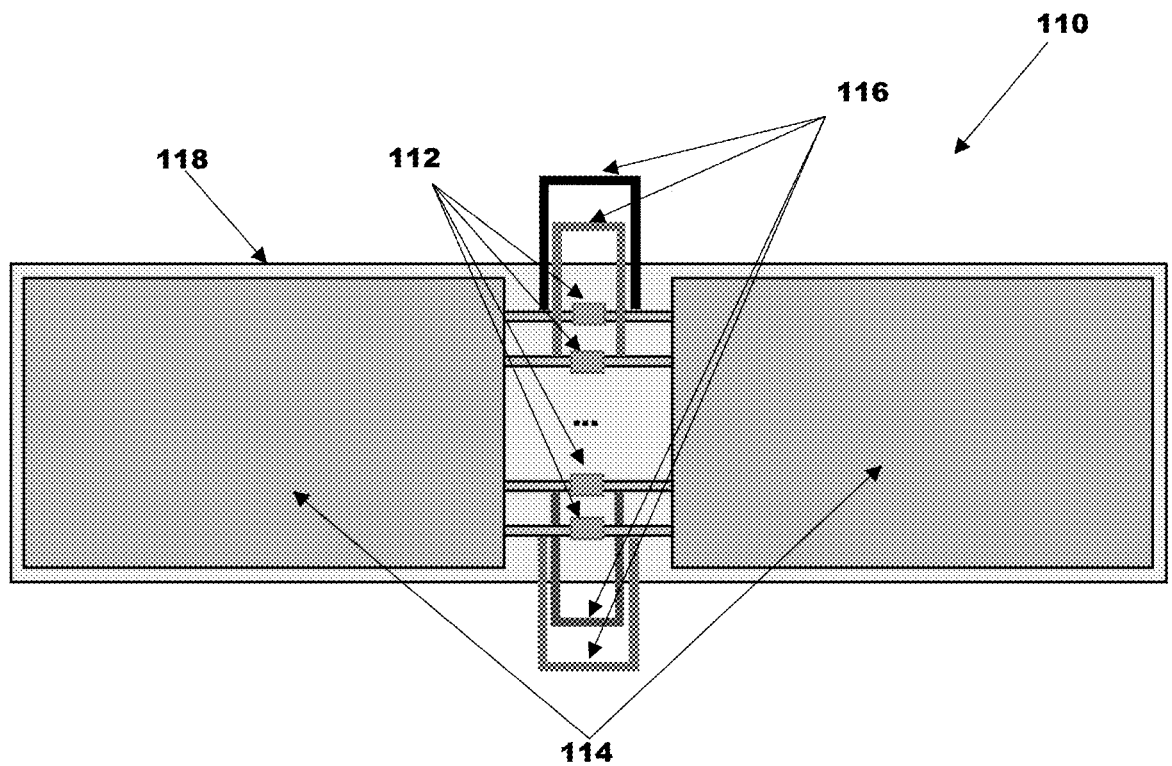
FIG. 3 is a schematic of an RFID sensor according to another embodiment, in which the sensor contains multiple sensing element—integrated circuit (IC) pairs.

FIG. 3 illustrates an embodiment of an RFID wireless sensor device 110 for monitoring corrosion of a structure (not shown). RFID wireless sensor device 110 comprises a plurality of IC chips 112 that share antenna 114, and multiple sensing elements 116 connected to different IC chips 112 to form a short circuit in each respective IC chip 112. Each sensing element 116 is configured to change status when a predetermined corrosion rate or accumulation has been reached. This can be achieved, for example, by using different sizes or thicknesses of material used for each sensing element 116. Thus, as corrosion progresses, individual sensing elements 116 will change status coinciding with their predetermined corrosion level or rate and will thereby turn on/off their associated IC chips 112 sequentially. Each IC chip 112 can be identified as an independent (and unique) tag. As the IC chips 112 turn on, they will communicate with the reader during interrogation. In this way, the status or degree of corrosion of the structure being monitored can be determined.

As further illustrated in FIGS. 2 and 3, the IC chips (12 and 112, respectively) and antennae (14 and 114, respectively) are encased in a protective housing (e.g., a plastic enclosure) such that the only part of the RFID sensor (10 and 110, respectively) that is exposed to the environment is the sensing element(s) (16 and 116, respectively).

Although FIGS. 2 and 3 have been described above, with reference to their application in monitoring corrosion, a similar construction is employed for detection of leaks or for monitoring other indicators of a loss of structural integrity (e.g., moisture, pH, fracture, etc.). The RFID wireless sensor device is adapted for each use by the use of sensing elements manufactured from material that is sensitive to the relevant indicator in the same or similar manner as the material from which the structure being monitored is constructed. In some embodiments, the sensing element is made, at least in part, from the same material as the material used in the structure being monitored.

Figure 4:
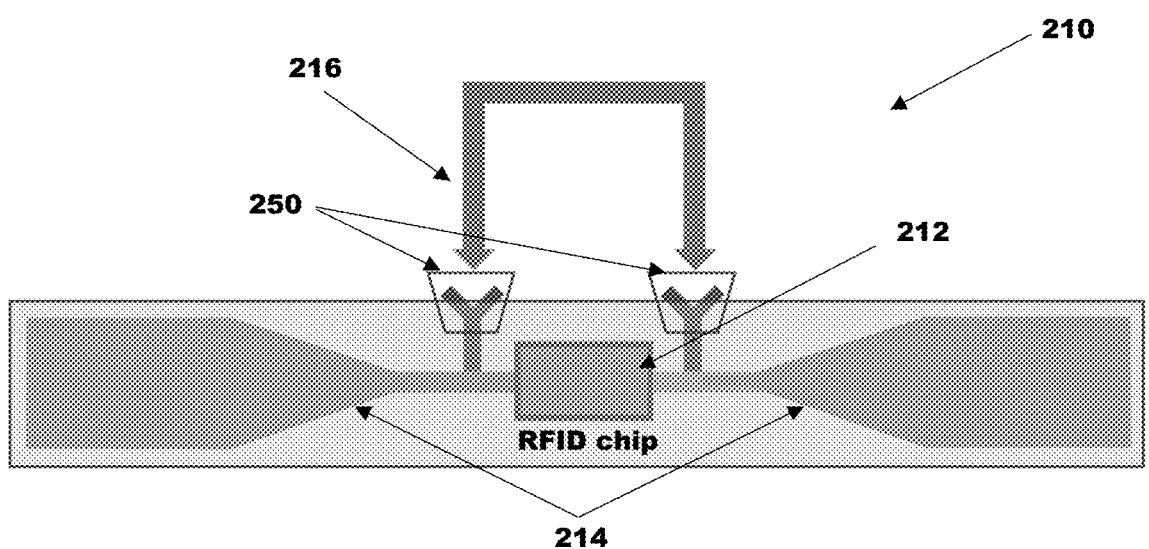
FIG. 4 is a schematic of an RFID sensor according to another embodiment, in which the sensor is for use with a plug-in sensing element used as a short-circuit.

In some embodiments, the RFID wireless sensor device is manufactured such that the sensing element can be replaced. With reference to FIG. 4, RFID wireless sensor device 210 is manufactured with receptacles (such as outlets) 250 designed for removable sensing element 216 (such as a plug-in connector). As in the devices described above, when attached, sensing element 216 is initially in a conductive or non-conductive state and enables or disables a short circuit between IC chip 212 and antenna 214 so that there is no connection or with connection, respectively, between the IC chip 212 and the antenna 214. Once sensing element 216 changes its conductivity state, as a result of corrosion or contact with an indicator of loss of structural integrity, sensing element 216 becomes non-conductive or conductive and the short circuit is disabled or enabled, such that antenna 214 is connected or disconnected, respectively, to IC chip 212, and the sensor 210 can or cannot communicate with the reader 40 when it is interrogated by reader 40.

Figure 5:
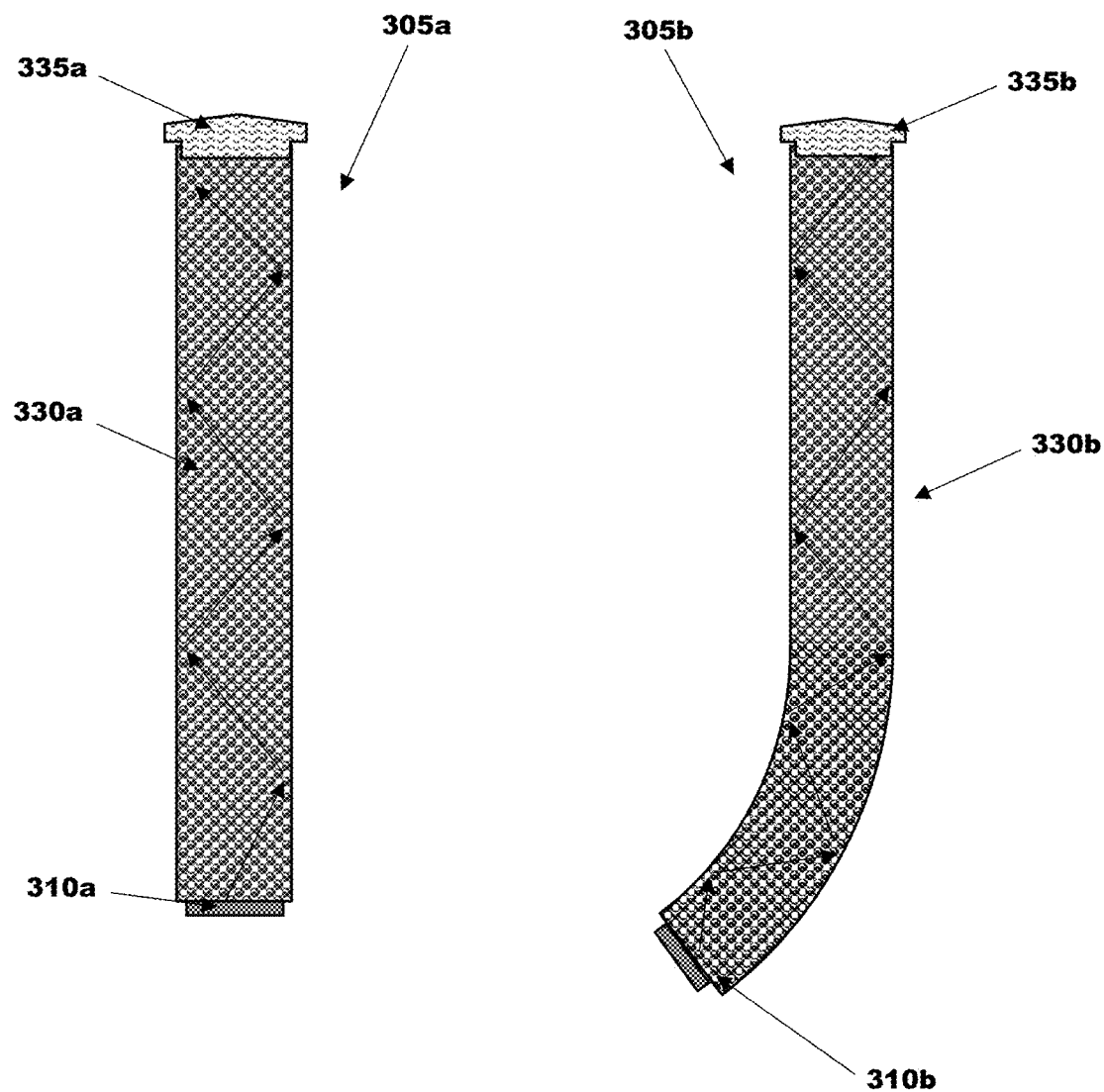
FIG. 5 is a schematic showing two examples of an RFID wireless sensor device, one having a straight channel for signal transmission and the other having a curved (bent) channel for signal transmission.

With reference to FIG. 5, the RFID wireless sensing device of the present application comprises an RFID sensor and a channel that is defined by a tube or a tunnel, or the like. As depicted in FIG. 5, RFID wireless sensing device 305a comprises RFID sensor 310a, a straight channel 330a that is sealed at both ends, with cap 335a providing the upper seal. An empty channel can be used, which will allow direct, line-of-sight communication between a reader and the sensor. However, when an empty tube (e.g., made from plastic or wood) is used to define the channel, the tube is susceptible to damage or deformation as a result of external pressure, for example from the surrounding water, soil and/or rock.

As depicted in FIG. 5, channel 330a contains an optional granular filler material. In this case, the tube is filled with a material in order to reduce or avoid altogether the damage and deformation caused by external pressure. The present inventors have surprisingly found that if the internal filler material is a dry, granular material (such as sand, and as described in more detail above), it does not block or attenuate the signal from the sensor. Instead, it was found to enhance the travel of the signal such that the signal is able to travel a longer distance than it would travel in the empty channel.

The RF signal strength can be further enhanced by putting a layer of conductive material (e.g., a metal layer or a metal foil) on the inner surface of the tube or tunnel that defines the channel, if the tube or tunnel is not made of metal.

With further reference to FIG. 5, in one embodiment RFID wireless sensor device 305b comprises RFID sensor 310b, a curved or bent channel 330b that is sealed at both ends, with cap 335b providing the upper seal. The inner surface of the curved or bent tunnel may be coated or lined with a metal layer, if it is not made of metal, so that the signals can be reflected internally within the channel, and reach the reader. The use of a dry, granular filler material, such as sand, in curved channel 330b enhances the propagation of the RF signal along channel 330b (if the channel is made of non-conductive material), even though there is no direct line-of-sight between RFID sensor 310b and the reader.

Process for Monitoring a Buried Structure

The present application further provides a method for detecting a change in environment in a buried structure. A reader is used to interrogate an RFID sensor within an RFID wireless sensor device as described in detail above. The RFID sensor is attached to or directly adjacent to one end of the channel for directing transmission of signals between the antenna and the reader, and wherein the sensing element is responsive to a change caused by its environment to switch from an initial conductive state to a non-conductive state, or to switch from an initial non-conductive state to a conductive state. The RFID sensor is also adjacent to or attached to a buried structure being monitored for structural integrity.

The structural integrity of the buried structure can be compromised by, for example, corrosion or physical damage (e.g., cracks or holes), which may lead to the leak of the substance carried within the structure to the environment. The present method monitors structural integrity using a sensing element, within the RFID sensor, that can either indirectly measure the level of corrosion of the structure material, or respond to the presence and/or level of an indicator of loss of structural integrity. The indicator can be, for example, a leaked substance, pH, water, etc.

According to the present method, a reader interrogates the RFID sensor and determines whether there has been a change in the state of the sensing element from its initial state. If there has been no change, then the structural integrity of the underground structure is within a predetermined tolerance. However, if there has been a change, then it is indicative of a reduction in the structural integrity.

When the RFID wireless sensor device comprises an RFID sensor having more than one sensing element—IC pairs (as detailed above), then the continuous changes in structural integrity can be monitored because the consecutive changes of the states of the sensing elements connected to the different IC chips can be detected. The RFID reader can interrogate multiple sensors in the same time.

To gain a better understanding of the invention described herein, the following examples are set forth. It should be understood that these examples are for illustrative purposes only. Therefore, they should not limit the scope of this invention in any way.

EXAMPLES

Example 1

The RFID transponders (tags) used in the experiments were commercial passive ultrahigh frequency (UHF) tags (GAO RFID Inc., Toronto, Ontario). These tags have rectangular surfaces with dimensions of 150×18 mm$^2$ (3 mm in thickness). The tags were encased with laminated polycarbonate and acrylonitrile butadiene styrene (ABS) plastics, and can tolerate high temperature (<200° C.), humidity and pressure (<1.5 MPa). The RFID reader was a Voyantic Tagformance™ system that is designed to evaluate the functionality and performance of individual UHF RFID transponders. Unlike conventional RFID readers used in supply chain management where high reading speed and accuracy in ID recognition are required, the Voyantic Tagformance™ reader is designated to recording the RF signal strength during the forward and reverse communications (transmit and backscatter) between the reader and tag, instead of only retrieving the tag ID as in most conventional RFID applications. The actual output power range of the Tagformance™ RF generator is 0 to +27 dBm with an absolute accuracy of ±1.0 dB. The RF receiver has a usable linear dynamic range of −80 to +10 dBm with a sensitivity of −75 dBm.

The communication between the RFID reader and tag was realized through the establishment of forward and reverse links from the reader to the tag and back to the reader again. For passive tags, the tag itself does not have power, so it has to draw power from the RF energy (the carrier) generated by the reader to energize itself. There is a minimum power required to energize a tag's RF integrated circuit (IC) to establish the forward link. The Tagformance™ reader records this power (in dBm) as the Threshold Transmitted Power to operate the tag. Similarly, there is also a minimum power required to decode the RF signal backscattered from the tag, which is recorded by the reader as the Threshold Backscattered Power (also in dBm, but it is negative since the backscattered power is lower than 1 milliwatt).

Three types of measurements were conducted:
Frequency Sweep: the tag was scanned in a frequency range of 860-960 MHz in steps of 2 MHz, and the threshold transmitted power was recorded as a function of the frequency; the corresponding backscattered power is also recorded.
Backscatter Power Sweep: in this measurement, the frequency was fixed at 915 MHz (i.e. the middle value of North American frequency range 902-928 MHz) and the reader transmitted power was varied from −5 dBm to 30 dBm in steps of 0.5 dBm, while the tag backscattered power strength was recorded as a function of the reader transmitted power.
Orientation Sweep: the tag antenna's polarization direction was varied from 0° to 360° in steps of 15° to the reader antenna's polarization direction, and the threshold transmitted power and threshold backscattered power were recorded at each angle.

Figure 6:
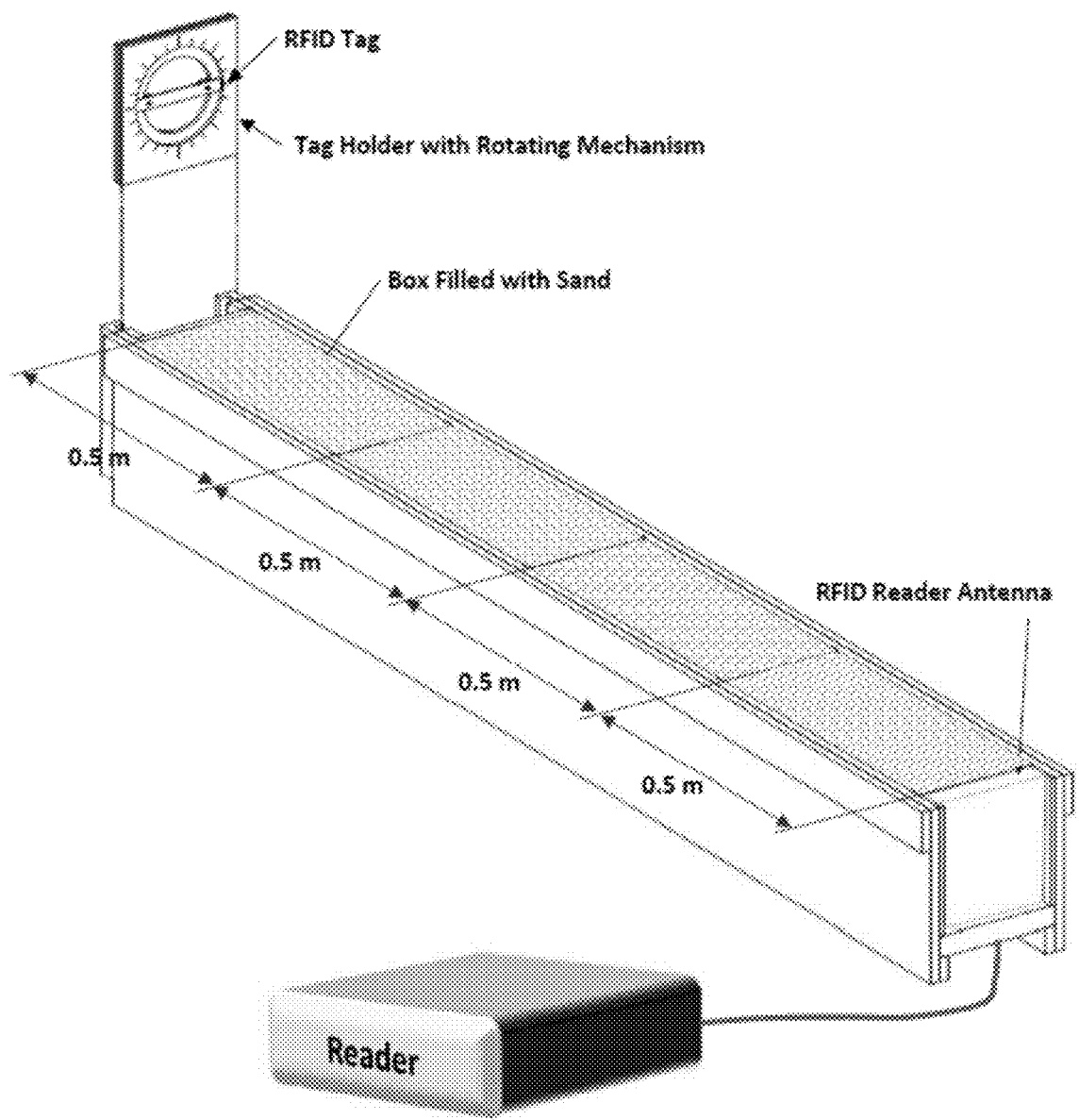
FIG. 6 is a schematic of the sensor reading performance testing system used in Example 1, in which the box is made of wood and can be filled with particulate material, e.g., sand, and the tag and reader antenna can be separated at a specific distance.

The experiments on the RFID reading performance with or without sand were conducted using a testing box made of wood, as shown in FIG. 6. The wood box has four continuously aligned chambers that can be filled with sand, and the tag and the reader antenna are separated by the sand at various distances, e.g., 0.5 m, 1.0 m, 1.5 m and 2.0 m. For each distance, the tag was read with or without sand in the box so that the reading performance could be compared. Except for orientation sweep, the tag longitudinal direction was always parallel to the antenna polarization direction, i.e., with an orientation of 0°. Orientation sweep (angular) tests were conducted to evaluate the readings when the tag longitudinal and the reader polarization directions were not parallel, i.e., at angles from 0° to 360°. A tag holder was manufactured to facilitate the rotation of the tag for 0°-360° with respect to the reader antenna.

FIGS. 7-9 illustrate the reading results with or without sand in between the tag and the reader antenna.

FIG. 7 shows a comparison of the threshold transmitted power: for all reading distances tested, the threshold transmitted power was always higher for testing without sand than with sand. This means that, with sand in between the tag and reader, the power required to energize the tag was much lower than without sand (air). This indicates that the sand enhanced the reading performance of the tag. The backscattered powers at these transmitted powers were compared in FIG. 8, where it is shown that the backscattered powers were always higher when there was sand between the tag and reader at the same reading distance. Again, this indicates that sand indeed enhanced the reading performance.

The variation of the threshold transmitted power with respect to the reading distance is shown in FIG. 9, where readings at some frequencies (860-960 MHz, at every 10 MHz) were plotted against the tag-reader distance. It is seen that the difference between the readings with and without sand was relatively small when the reading distance was small (0.5 m). With the increase of the reading distance, the difference between the readings with and without sand becomes large. Generally, the readings with sand varied only slightly with the reading distance, while readings without sand changed significantly with the reading distance.

FIG. 10 shows the backscatter power sweep results. It confirmed again that filling sand between the reader and the tag was able to significantly enhance the reading performance. For example, when the read distance is 1.5 m or 2.0 m, the threshold transmitted power for reading without sand is 13.5 and 15 dBm, respectively. If sand was filled between the reader and the tag, the TTP reduced to 0 dBm. In addition, the associated backscattered powers were also much higher than those without sand.

The orientation sweep results are shown in FIG. 11, where the backscattered powers at the threshold transmitted power of a fixed frequency (915 MHz) were compared against the angle between the tag longitudinal direction and the reader antenna polarization direction. It can be seen that with the increase of reading distance, the readings without sand became weaker and weaker at all the orientations, while the readings with sand were much larger and essentially did not change with the increase of the reading distance. In fact, with the increase of the reading distance, the backscattered powers at some angles (e.g. 60°/240°, 75°/225°, 105°/285°, and 120°/300°) were increased if there was sand in between the reader and the tag.

It is noted that the dryness of the sand (i.e., the humidity or moisture level of the sand) had a considerable effect on the reading performance. As shown in FIG. 12, if the sand was relatively dry, e.g. with 40% moisture, the backscattered power was relatively high. If the sand was wet (more than 100% moisture), the readings could be significantly weakened. On the other hand, if the sand was wrapped in a metal foil (i.e., if the sand box was lined with metallic foil), the signal strength could also be significantly enhanced (FIG. 13).

From FIG. 14, it is noticed that the particle size may have an effect on the reading performance, but the small difference between the two sands tested (160 μm vs. 210 μm) did not cause a big difference in performance. At short (0.5 m) or long (2.0 m) reading distances, the readings were quite similar to each other, but at an intermediate distance (1.0-1.5 m), a smaller sand particle size slightly promoted the readings at most of the frequencies as compared to the larger particle size.

Example 2: Transmission of RFID Signal Through Channels with Different Cross-sectional Shapes Using the same RFID reader as described in Example 1, channels with different cross-section shapes and dimensions were tested for signal transmission with and without being filled with sand (160 μm particle size).

The channels were made of low carbon steel, having a length of 1 m (reading distance) and with the following shapes:
Round (circle) cross section with diameter 282.8 mm (inscribing a 200 mm×200 mm square to cover the RFID antenna).
Square cross section with dimensions 200 mm×200 mm
Oval cross section with dimensions: 200 mm×250 mm (S) and 200 mm×300 mm (L).
Rectangular cross section with dimensions: 200 mm×250 mm (S) and 200 mm×300 mm (L).

The table below summarizes the structure of the channels studied.

| Study | Shape | Cross-section dimension (mm) | Length (mm) | Bend Angle (°) | Note |
|---|---|---|---|---|---|
| A | Circle | Φ 282.8 | 1000 | Straight | 200 mm square inscribed in circle |
| B | Square | 200 × 200 | 1000 | Straight | |
| C | Square | 200 × 200 | 1000 | 30 | |
| D | Square | 200 × 200 | 1000 | 45 | |
| E | Square | 200 × 200 | 1000 | 90 | |
| F | Oval | 200/250 | 1000 | Straight | |
| G | Oval | 200/250 | 1000 | Straight | |
| H | Rectangle | 200 × 250 | 1000 | Straight | |
| I | Rectangle | 200 × 300 | 1000 | Straight | |

FIGS. 15 (A)-(I) provide cross-sectional, perspective and side views, with the dimensions shown, of each of the channels studied.

FIG. 16 summarizes a comparison of the effect of channel shape and bending angle on the signal strength. FIGS. 18-26 illustrate the difference in signal strength observed using the different channel shapes.

The results of these studies demonstrated that all the channels tested were effective in RFID signal transmission, and that the channel cross-section shape will affect the directing of the RFID signal within the channel. For the steel tubes tested, all the shapes (circle, square, oval, and rectangle) resulted in a range of frequencies where the signals could not be directed, i.e., the signals are cancelled out because of the reflection and absorption by the metal. The frequencies at which the signals were cancelled were different among the different shapes. However, for the RFID signals that were able to be directed, the signal strength was much stronger than in air (i.e., signal transmission in the absence of a channel). These results demonstrate that all the channels tested will strengthen the signal if it is not cancelled out. Generally, the square shape was found to be better at signal transmission than the other shapes studied.

This study further demonstrated that bent channels were effective in directing RFID signal from one end of the channel to the other end. This was true even in the case where the angle of bending was 90°. Again, at some signal frequencies, the signals were cancelled out. Without wishing to be bound by theory, cancelling out of the signal may be due to: (i) the reflection of the signal by the metal tube, and interaction of reflected signals, (ii) the absorption of by the ferrous tube material (steel). If the tube is made of non-ferrous material (e.g., wood) or lined with non-ferrous metal foil (e.g., aluminum foil) and filled with sand, the cancellation of signal can be avoided.

Example 3: Transmission of RFID Signal Through Wooden Channels

Using a testing system as described in Example 1, the effects of aluminum foil liner and sand in wooden channels were studied: (i) no aluminum and no sand, (ii) with aluminum but without sand, (iii) with sand but without aluminum, (iv) with aluminum and with sand. In each case the channel had a square-shaped cross-section, with a side of 200 mm, as illustrated in FIG. 6.

The results of this study are summarized in FIGS. 27a and 27b. Without aluminum liner and sand (in air), the signal was the weakest. With aluminum liner but without sand, the signal was considerably enhanced. With sand but without aluminum liner, the signal was significantly strengthened. With both sand and aluminum liner, the signal was only slightly enhanced as compared to that with sand only (without aluminum liner). Thus, it was the sand that has the most significant effect on strengthening the signal.

A metal (steel) channel without sand typically performs better at directing RFID signal than the same channel filled with sand. However, the above results demonstrated that when the channel was made of wood, and lined with aluminum foil on the inner surfaces, filling the channel with sand slightly increased the RFID signal transmission.

This study illustrates that when the channel is made of a non-conductive material, then filling the channel with sand can strengthen the RFID signal transmission, even when no metal inner surface is provided. In other words, the channel can be made of a non-conductive material, but it needs to be filled with a particulate material, include a conductive liner, or both, to enhance RFID signal transmission. On the other hand, channels made of a ferrous metal (e.g., steel) can transmit the RFID signal without the need for an internal particulate material or conductive liner, but at some frequencies, the signal may be cancelled out.

The type of the metal used to manufacture channels will affect the efficiency or ability of the channel to direct RFID signal. As described in Example 2, the steel tubes tested as a channel showed cancellation of the RFID signal at some frequencies. The use of the aluminum foil liner in the wooden channels did not result in cancellation of the RFID signal at any frequencies. Without wishing to be bound by theory, this may be due to the magnetic permeability of the ferrous metal.

Example 4: Transmission of RFID Signal Through Channels with Different Particulate Fillers Using the same RFID reader as described in Example 1, different particulate materials were tested for their ability to assist or enhance RFID signal transmission in a channel. In addition to the sand ($SiO_2$) studied previously, the following particulate materials were studied:

Graphite (average particle size: 25 μm).
Aluminum oxide (average particle size: 20 μm).
Silicon carbide fine (average particle size: 25 μm).
Silicon carbide coarse (average particle size: 250 μm).

These studies were conducted using a round tube made of plexiglass, 63.5 mm in diameter and 450 mm in length. The tag used for this configuration had dimensions 75 mm×15 mm×2 mm, as compared to the larger tag (150 mm×18 mm×3 mm) used for all the other studies described herein.

The results of this study are summarized in FIGS. 28a and 28b.

This study demonstrated that other particulate materials have similar effects to sand. However, the conductivity of the material plays an important role in the effectiveness. Conductive particles, e.g., graphite, will significantly weaken the signal (as compared to air), while non-conductive particles (e.g., SiC, $Al_2O_3$, $SiO_2$) will strengthen the signal. SiC (both fine and coarse) results in the largest strengthening among all the materials tested. Thus, conductive particulate material is not suitable for the strengthening of the signal.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus comprising:
    a radio frequency identification (RFID) sensor comprising:
        an antenna configured to receive an interrogation signal from a reader and to transmit a response signal to the reader;
        at least one integrated circuit (IC) connected to the antenna; and
        at least one sensing element; and
    a channel for directing transmission of signals between the antenna and the reader,
    wherein the channel is sealed at both ends with a non-conductive, corrosion resistant material and wherein the RFID sensor is attached or directly adjacent to a first end of the channel,
    wherein the at least one sensing element is responsive to a change induced by its environment to switch from a conductive state to a non-conductive state, or to switch from the non-conductive state to the conductive state.

2. The apparatus of claim 1, wherein the channel is filled with a non-conductive particulate material.

3. The apparatus of claim 2, wherein the particulate material is at least one of sand (SiO2), SiC and Al2O3.

4. The apparatus of claim 1, wherein the channel comprises a conductive inner surface.

5. The apparatus of claim 1, wherein the channel has a square, rectangular, oval or circular cross-sectional shape.

6. The apparatus of claim 5, wherein the channel has a square cross-sectional shape.

7. The apparatus of claim 1, wherein the at least one sensing element is one of:
    integrated in the RFID sensor as a short circuit between the at least one IC and the antenna;
    integrated as a connection between the antenna and the at least one IC; and
    plugged into the RFID sensor and acting as the short circuit between the antenna and the at least one IC.

8. The apparatus of claim 1, wherein the antenna and the at least one IC are contained within a protective housing such that only the at least one sensing element is exposed to the environment of the at least one sensing element.

9. The apparatus of claim 1, wherein the RFID sensor operates at an RFID frequency in an ultrahigh range or a microwave range.

10. The apparatus of claim 1, wherein the reader is distant from the RFID sensor and the RFID sensor comprises a battery.

11. The apparatus of claim 1, wherein the channel is straight, curved or bent.

12. The apparatus of claim 1, wherein the at least one sensing element provides a short circuit to the RFID sensor when the at least one sensing element is conductive, and the short circuit is broken when the at least one sensing element switches to the non-conductive state.

13. The apparatus of claim 12, wherein the at least one sensing element comprises a corrodible material or a leak-sensitive material.

14. The apparatus of claim 12, wherein the at least one sensing element is initially conductive or non-conductive.

15. The apparatus of claim 1, wherein the apparatus is attached to or adjacent to a structure that is buried underground or underwater.

16. The apparatus of claim 15, wherein the structure is a pipeline.

17. A method for detecting a change induced by an environment of a buried structure, said method comprising:
    positioning a radio frequency identification (RFID) sensor adjacent to the buried structure or attaching the RFID sensor to the buried structure, wherein the RFID sensor comprises:
        an antenna configured to receive an interrogation signal from a reader and to transmit a response signal to the reader;
        at least one integrated circuit (IC) connected to the antenna; and
        at least one sensing element in an initial condition,
    wherein the RFID sensor is attached to or directly adjacent to a first end of a channel for directing transmission of signals between the antenna and the reader, and wherein the at least one sensing element is responsive to a change induced by its environment to switch from an initial conductive state to a non-conductive state, or to switch from an initial non-conductive state to a conductive state;
    positioning the channel for directing transmission of the signals between the antenna and the reader such that the RFID sensor is attached or directly adjacent to the first end of the channel, the channel being sealed at both ends with a non-conductive, corrosion resistant material;
    interrogating the RFID sensor with the reader; and
    determining whether the at least one sensing element has changed from its initial condition.

18. The method of claim 17, wherein the at least one sensing element is one of:

integrated in the RFID sensor as a short circuit between the at least one IC and the antenna;

integrated as a connection between the antenna and the at least one IC; and plugged into the RFID sensor and acting as the short circuit between the antenna and the at least one IC.

19. The method of claim 17, wherein the buried structure is underground or underwater.

20. The method of claim 19, wherein the buried structure is a pipeline.

* * * * *